United States Patent
Estill

(10) Patent No.: US 10,740,992 B2
(45) Date of Patent: Aug. 11, 2020

(54) ITEM DEPOSITORY APPARATUS OPERATED RESPONSIVE TO DATA BEARING RECORDS

(71) Applicant: Danby Products Limited, Guelph (CA)

(72) Inventor: Jim Estill, Guelph (CA)

(73) Assignee: SHIPPERBEE, Inc., Guelph (CA)

( * ) Notice: Subject to any disclaimer, the term of this patent is extended or adjusted under 35 U.S.C. 154(b) by 0 days.

(21) Appl. No.: 16/253,461

(22) Filed: Jan. 22, 2019

(65) Prior Publication Data

US 2019/0236873 A1    Aug. 1, 2019

Related U.S. Application Data

(60) Provisional application No. 62/622,193, filed on Jan. 26, 2018.

(51) Int. Cl.
| | |
|---|---|
| *G07F 19/00* | (2006.01) |
| *G07C 9/00* | (2020.01) |
| *E05G 7/00* | (2006.01) |
| *G06Q 20/04* | (2012.01) |

(52) U.S. Cl.
CPC ......... *G07C 9/00309* (2013.01); *E05G 7/001* (2013.01); *G06Q 20/0453* (2013.01); *G07C 9/00912* (2013.01); *G07F 19/202* (2013.01); *G07F 19/205* (2013.01)

(58) Field of Classification Search
CPC ............ G07C 9/00309; G07C 9/00912; G07C 9/00571; G07C 9/00896; G07F 19/205; G07F 19/202; G06Q 20/0453; E05G 7/001

See application file for complete search history.

(56) References Cited

U.S. PATENT DOCUMENTS

| | | | |
|---|---|---|---|
| 6,483,433 B2 | 11/2002 | Moskowitz et al. | |
| 7,636,033 B2 * | 12/2009 | Golden | B60R 25/018 340/426.11 |
| 7,822,618 B2 | 10/2010 | Kaneko | |
| 8,157,162 B2 * | 4/2012 | Jonsson | G07D 3/14 235/379 |
| 9,000,916 B2 * | 4/2015 | Meeker | E05G 1/00 340/540 |
| 9,861,221 B2 | 1/2018 | Jiang | |

(Continued)

OTHER PUBLICATIONS

International Search Report and Written Opinion of The International Searching Authority in PCT/IB2019/050644.

*Primary Examiner* — Seung H Lee
(74) *Attorney, Agent, or Firm* — Ralph E. Jocke; Walker & Jocke

(57) ABSTRACT

A depository operates to accept and make available deposit items to authorized users responsive at least in part to data read from data bearing records. The depository (10) includes a body (12) that bounds and interior area (14). The depository includes a door (18) that is controlled by a lock (24) so that only authorized users can access the interior area. The depository includes at least one input device (20) operative to receive data usable to identify users authorized to access the depository. At least one reading device (26) is operative to read indicia included on depository items so that depository items placed in or removed from the interior area can be tracked. The depository is in operative connection with a network (50) that enables the transport and tracking of deposit items.

28 Claims, 30 Drawing Sheets

(56) References Cited

U.S. PATENT DOCUMENTS 10,264,906 B2 * 4/2019 Bloom .................... G07F 17/12
2015/0371468 A1 * 12/2015 Mackin .............. G06Q 10/0836
340/5.26

* cited by examiner

ITEM DEPOSITORY APPARATUS OPERATED RESPONSIVE TO DATA BEARING RECORDS

TECHNICAL FIELD

This invention relates to a depository apparatus and system that operates to control and record the receipt and removal of deposit items in response to data bearing records, which may be classified in U.S. Class CPC G07F; USPC 235/379.

BACKGROUND

Depositories that operate to accept deposit items from users have been implemented in a number of different business environments. Commonly depositories are implemented for receiving items that are to be provided to an owner of the depository. For example, depositories have been implemented to receive financial deposits, utility bill payments or other items of value which are to be provided only to the bank, utility company or other entity that operates the depository. Generally the depositories are implemented so that once an item has been deposited therein by the user, only an authorized representative of the depository operator is enabled to access the deposited items and remove them from the depository for further processing. Various endeavors have been made to improve depositories and the processes associated with the receipt and removal of deposit items. However, depositories and depository systems may benefit from improvements.

SUMMARY

The exemplary arrangements described herein relate to a depository and associated system that operate to accept and make available deposit items to authorized users responsive at least in part to data read from data bearing records. Each exemplary depository includes a body that bounds an interior area which is configured to hold deposit items. The exemplary interior area is accessible through an opening in the body. Access through the opening to the interior area is controlled by a door that is mounted in connection with the body and is movable between open and closed positions. An electronic lock is associated with the door. The lock is selectively changeable between locked and unlocked conditions. In the locked condition the lock is operative to hold the door in the closed position preventing access to the interior area.

The exemplary depository includes at least one reading device. The reading device is configured to read indicia on items that are positionable within the interior area. The exemplary embodiment further includes at least one input device. The at least one input device is usable to input data which enables authorized users to access the interior area of the depository.

In the exemplary arrangement the depository includes control circuitry. The control circuitry is in operative connection with the at least one reading device, the at least one input device, the lock and at least one wireless communication device. Responsive to the receipt of user identifying information from data bearing records through the at least one input device, the control circuitry is operative to cause an access determination to be made that the received user identifying information corresponds to stored data associated with an authorized user that is authorized to access the interior area of the depository. Responsive at least in part to the determination that the data bearing record data corresponds to an authorized user, the lock is changed from the locked condition to the unlocked condition such that the authorized user can open the door and access the interior area.

The exemplary control circuitry is further operative to cause the at least one reading device to read item indicia from a deposit item that is either being placed in or removed from the interior area. The control circuitry is further operative responsive to the at least one reading device to determine an action status indicative of whether the deposit item is removed from or placed into the interior area. An item determination is made through operation of the control circuitry concerning whether the item indicia that is read from the deposit item corresponds to stored data associated with a deposit item to be placed into or removed from the interior area of the depository by the authorized user.

Once the deposit item has been placed in or removed from the interior area of the depository, the door is closed and the control circuitry is operative to return the lock to the locked condition. A system in operative connection with the exemplary control circuitry is operative to track the status of the deposit item. This may include for example, tracking transport of the deposit item to another depository into which the item can be deposited by the authorized user who removed it from the first depository, so that the item may then undergo further processing activity. Alternatively, the system may enable a further authorized user to access and remove a deposit item that had been previously placed in the depository, and track the receipt of the deposit item by an authorized user that is the authorized recipient of the item.

Exemplary embodiments of the control circuitry associated with the depository enable determining the available space in the interior area. This enables evaluating whether the depository has space available to accept a further deposit item prior to a user who is seeking to deposit an item being directed to the depository. Other exemplary arrangements include one or more indicators which operate responsive to the control circuitry and the at least one reading device, to provide indications to users that they have placed or removed proper deposit items from the interior area. Other exemplary arrangements include the ability for the depository to provide audit information that includes identifying indicia associated with deposit items currently positioned in the interior area, as well as data regarding items previously placed in or removed from the depository. Exemplary arrangements may also capture and store images of users and deposit items to further provide records of activities conducted at the depository.

Numerous other features and arrangements may be used in exemplary embodiments to provide reliable, cost-effective deposit and item tracking capabilities.

BRIEF DESCRIPTION OF DRAWINGS

FIGS. 28 through 30 are a schematic representation logic flow carried out by the control circuitry of an exemplary depository, associated central system circuitry and devices operated by authorized users in connection with removing a deposit item from a depository.

DETAILED DESCRIPTION

Figure 1:
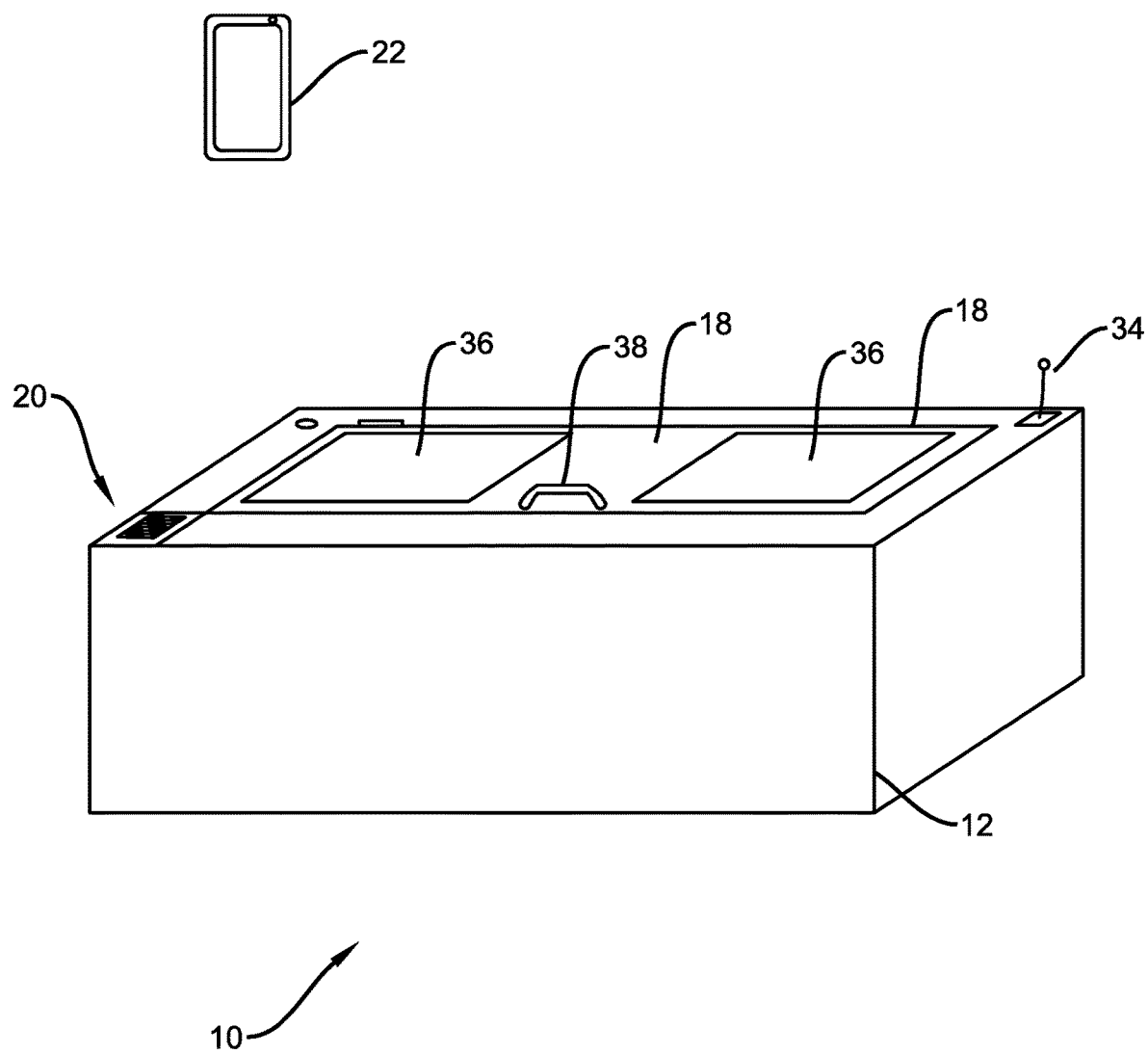
FIG. 1 is a perspective view of a depository of an exemplary embodiment with access to the interior area thereof closed, and a portable wireless device which may be used in conjunction with operation of the depository.
Figure 2:
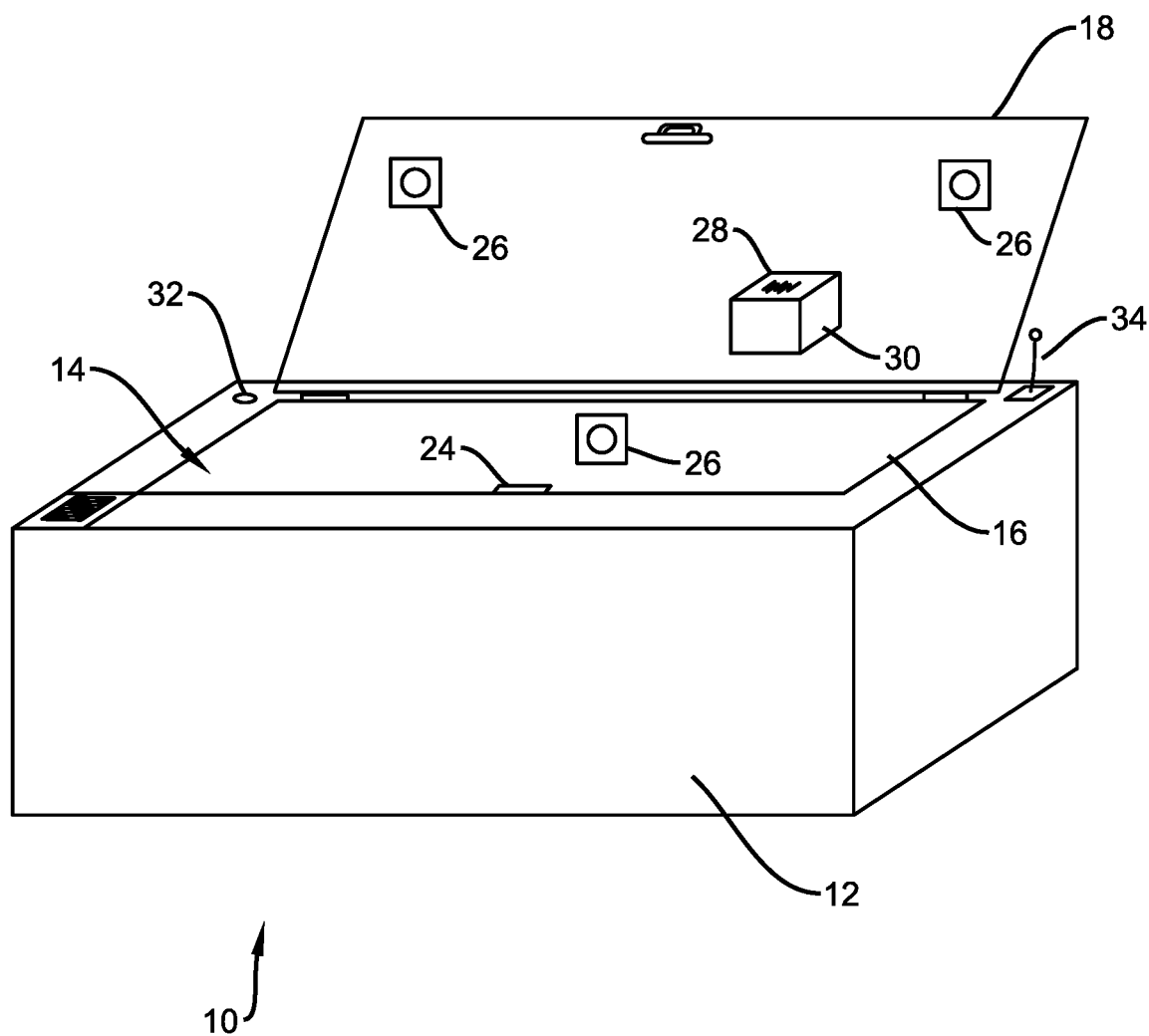
FIG. 2 is a view similar to FIG. 1 but with the interior area of the depository accessible from outside the depository.

Referring now to the drawings and particularly to FIG. 1, there is shown therein an exemplary depository generally indicated 10. The depository includes a body 12 which bounds an interior area 14 (see FIG. 2). The interior area 14 is accessible from outside the body 12 through an opening 16. A door 18 is movably mounted in operative connection with the body through hinged connections. The door 18 is sized for closing the opening 16 when the door is in a closed position as shown in FIG. 1. The door 18 is movable to an open position shown in FIG. 2 in which at least a portion of the door is disposed from the opening 16 and the interior area 14 is accessible from outside the body 12.

The exemplary depository 10 further includes at least one input device 20. In the exemplary embodiment the at least one input device includes a manually accessible input device that is operatively accessible when the door is in the closed position. In some exemplary embodiments the at least one input device 20 includes a keypad through which codes can be manually input. Further in exemplary arrangements the at least one input device includes a radio frequency (RF) input device that is operative to communicate wireless signals with a portable wireless device 22. In some exemplary arrangements the RF input device may include a device that is operative to communicate signals via a Bluetooth, NFC or other wireless communication method.

In other exemplary embodiments input devices may include other types of readers or devices that are operative to receive or read indicia. Exemplary input devices include without limitation, card readers, token readers, barcode readers, infrared readers or other types of devices that may receive inputs that are usable to determine whether access to the depository should be provided. Of course it should be understood that multiple different types of input devices may be used in operative connection with a single depository depending on the access requirements thereto.

The exemplary depository further includes an electronic lock 24. In the exemplary embodiment the lock is changeable between a locked condition in which the door 18 is held in a closed position, and an unlocked condition in which the door is enabled to be moved from the closed position to the open position. The exemplary depository further includes at least one reading device 26. In the exemplary embodiment the at least one reading device includes a plurality of image capture devices including at least one camera. The at least one reading device of the exemplary arrangement is usable to read machine readable indicia 28 that is included on deposit items 30. In exemplary arrangements the reading devices 26 are operative to read indicia such as bar codes (including without limitation two-dimensional bar codes and QR codes) that are included on deposit items. Further in exemplary arrangements the at least one reading device is operative to capture information usable to make a status determination that a deposit item is removed from or placed into the interior area of the depository. It should be understood however that although in the exemplary embodiment the reading devices operate to read visible indicia and capture images, in other arrangements other types of reading devices that read different types of signals or indicia may be utilized. This may include for example, card readers, fingerprint readers or other types of biometric readers including cameras or microphones, LIDAR image capture devices and readers that are capable of communicating using wireless signals such as the wireless input devices previously discussed.

The exemplary depository 10 further includes at least one indicator 32. As later discussed, the at least one indicator is operative to provide an indication as to whether a deposit item that is being placed in or removed from the interior area of the depository is a correct item to be removed by the particular user who has accessed the depository. The exemplary depository further includes at least one weight sensor 43. The at least one weight sensor is usable to determine the weight of one or more items that are within an interior area of the depository. The exemplary depository further includes a wireless communication device 34. The wireless communication device is operative to enable the control circuitry associated with the depository to communicate with one or more remote systems or devices as later discussed. Exemplary depository 10 further includes solar panels 36. The exemplary solar panels 36 are in supported connection with the door 18 and are suitable for providing electrical power to the depository from exposure of the solar panels to sunlight. In the exemplary arrangement a manually engageable handle 38 is in operative connection with the door 18 to facilitate the manual opening and closing thereof by authorized users. Of course it should be understood that these depository devices and configurations are exemplary and in other embodiments other configurations may be used.

Figure 3:
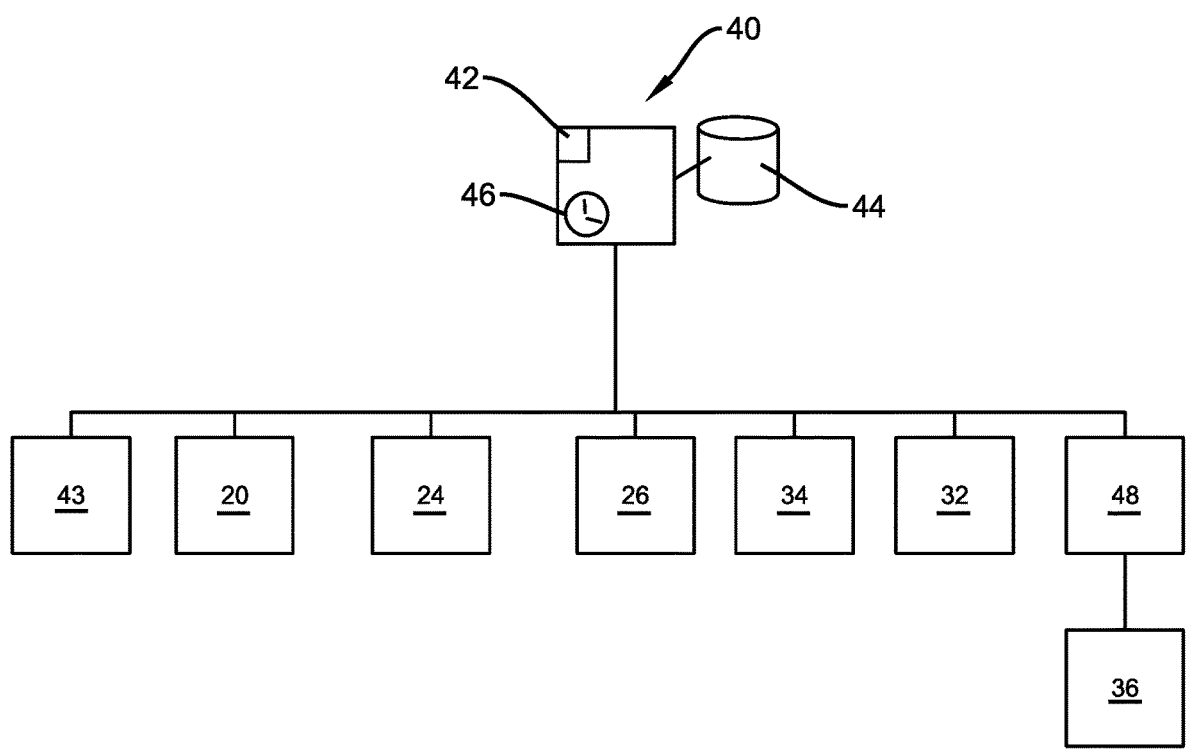
FIG. 3 is a schematic view of exemplary control circuitry used in connection with the depository.

As shown schematically in FIG. 3 the exemplary depository includes control circuitry 40. The exemplary control circuitry includes one or more circuits which are operative to communicate electrical signals and control the operation of the devices of the depository. In the exemplary arrangement the control circuitry 40 includes at least one circuit including a processor schematically indicated 42 and at least one data store schematically indicated 44. In exemplary arrangements the processor may include a processor suitable for carrying out circuit executable instructions that are stored in the one or more associated data stores. The processor includes or is in operative connection with a non-volatile storage medium including instructions that include a basic input/output system (BIOS). For example, the processor may correspond to one or more of a combination of a CPU, FPGA, ASIC or any other integrated circuit or other type of circuit that is capable of processing data and instructions. The one or more data stores may correspond to one or more of volatile or non-volatile memories such as random access memory, flash memory, magnetic memory, optical memory, solid state memory or other devices that are operative to store computer executable instructions and data. Processor executable instructions may include instructions in any of a plurality of programming languages and formats including, without limitation, routines, subroutines, programs, scripts, threads of execution, objects, methodologies and functions which carry out the actions such as those described herein. Structures for processors may include, correspond to and utilize the principles described in the textbook entitled Microprocessor Architecture, Programming and Applications with the 8085 by Ramesh S. Gaonker (Prentice Hall 2002), which is incorporated herein by reference in its entirety. Exemplary arrangements may include processors made by Intel Corporation, Advanced Micro Devices or other suitable processors. Of course it should be understood that these processors are exemplary of many types of processors that may be used.

The exemplary data stores used in connection with exemplary embodiments may include one or more of several types of mediums suitable for holding computer executable instructions and data. These may include for example, magnetic media, optical media, solid-state media or other types of media such as RAM, ROM, PROM, flash memory, computer hard drives or any other form of media suitable for holding data and circuit executable instructions. Exemplary control circuitry may include other components such as hardware and/or software interfaces for communication with devices within the depository or for communication with external devices and systems. The exemplary control circuitry 40 further includes a clock 46. The clock is operative to provide time functions in connection with operation of the depository as later discussed.

As represented in FIG. 3 the control circuitry 40 is in operative connection with the at least one input device 20, the lock 24 and the at least one reading device 26. The control circuitry 40 is further in operative connection with the at least one indicator 32, thet at least one weight sensor 43 and the at least one wireless communication device 34. In the exemplary arrangement the devices of the depository and the control circuitry are powered by a battery 48. The battery 48 is in operative connection with the solar panels 36. The control circuitry is operative to control the delivery of power to the battery such that the battery maintains a suitable power level for operating the depository during both light and darkness. However other embodiments may include other power sources, including the ability to connect to a suitable available supply of household current or other power for purposes of operating the depository. Exemplary depositories may also include features that are described in U.S. patent application Ser. No. 16/023,321 filed Jun. 29, 2018 which is incorporated herein by reference in its entirety.

Figure 4:
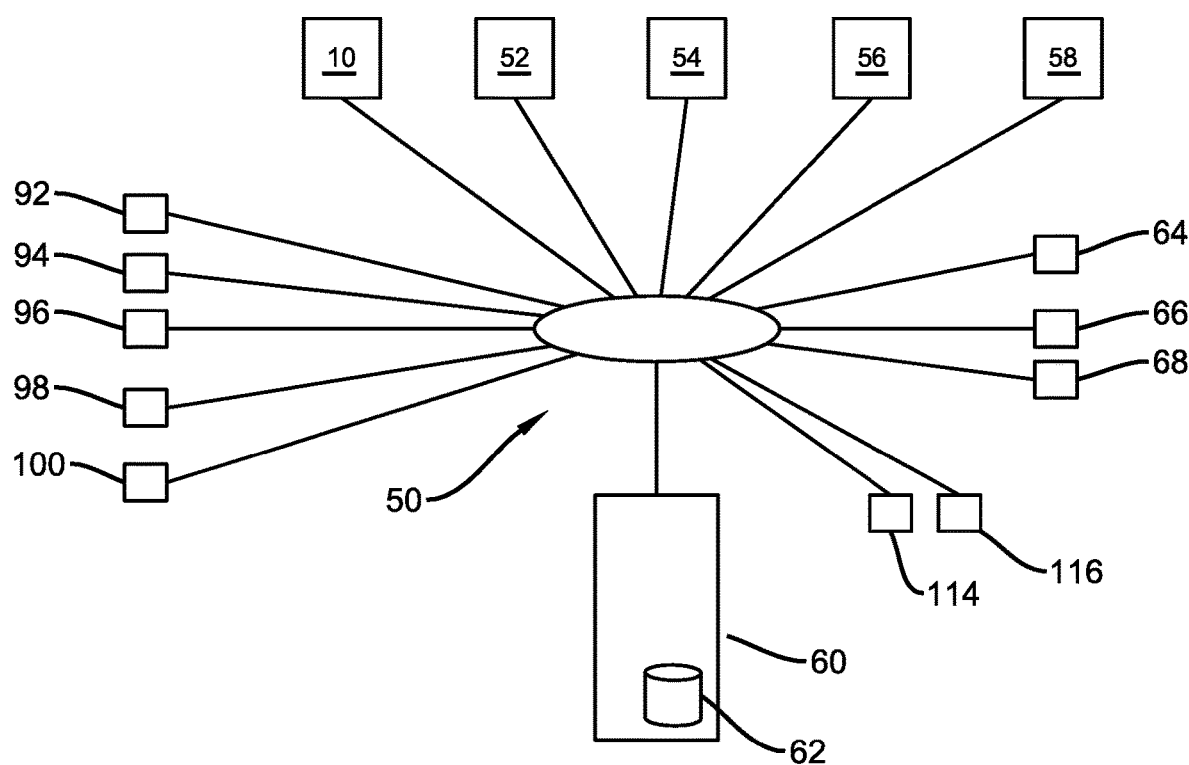
FIG. 4 is a schematic view of a network in which the exemplary depository may be operative.

FIG. 4 shows schematically an exemplary network 50 in which depository 10 may be operated. It should be understood that this exemplary network arrangement is shown schematically and in exemplary arrangements the network may include a plurality of interconnected networks.

In the exemplary arrangement a plurality of depositories 10, 52, 54, 56 and 58 are in operative connection with the network. In exemplary arrangements all these depositories may be similar to depository 10 previously discussed. The control circuitry associated with each of the depositories is operative to communicate in the network through the respective wireless communication device of the depository. Of course it should be understood that in other arrangements the depositories may be in operative connection with one or more networks via other wired or wireless communication methods. Further it should be understood that exemplary embodiments may include a much larger number of depositories than is represented in FIG. 4.

The exemplary network 50 is in operative connection with central system circuitry 60. The exemplary central circuitry includes one or more processors and data stores of the types previously discussed. In some arrangements the central system circuitry 60 may include one or more servers with associated data stores 62 that perform the functions hereinafter described. Exemplary arrangements may include central system circuitry located at a single location, or a distributed arrangement of control circuitry which operates in a cloud environment or other suitable environment for performing the functions described herein. Numerous different types of central circuitry arrangements may be utilized in connection with exemplary embodiments.

The exemplary network further includes a plurality of portable wireless devices that are operated by users who wish to send deposit items to others or to receive deposit items from others through the use of the depositories and associated system. Devices 64, 66 and 68 in FIG. 4 are representative of devices associated with individuals who send and/or receive deposit items.

Figure 5:
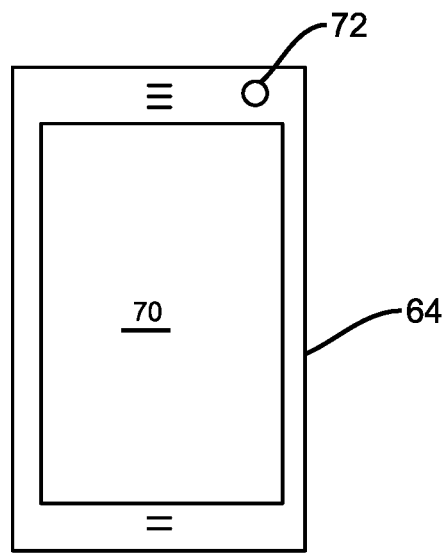
FIG. 5 is a plan view of a portable wireless device that is usable by an authorized user of the depository in connection with obtaining access thereto for placing items into or removing items from the interior area of the depository.
Figure 6:
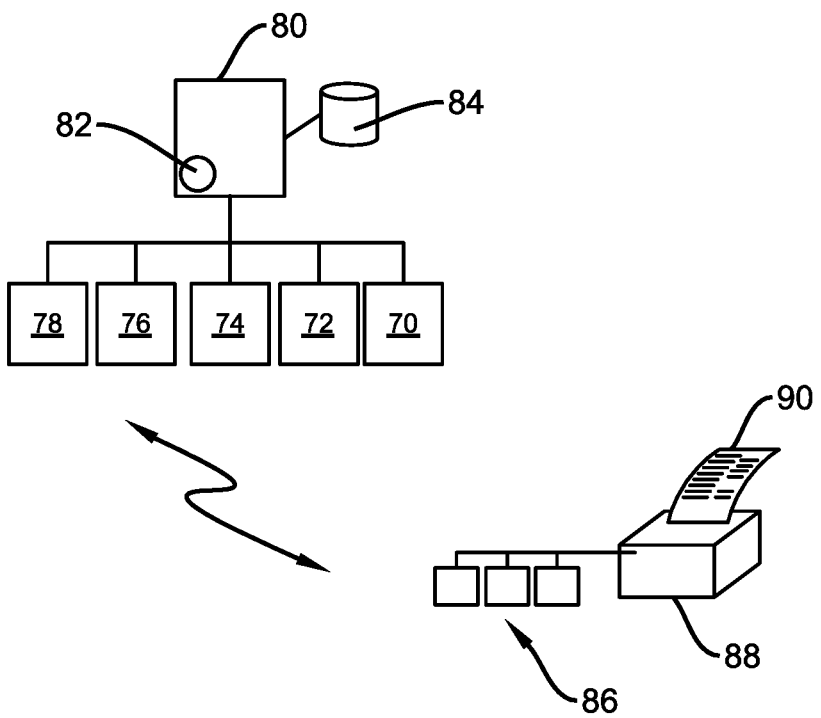
FIG. 6 is a schematic view of the circuitry associated with the device of FIG. 5 and an associated system for producing data bearing records that can be associated with deposit items.

FIGS. 5 and 6 show an exemplary portable wireless device 64 that is used by such users in the exemplary network. Device 64 in some exemplary arrangements may include a portable smart phone which includes user input devices and user output devices such as an associated touchscreen 70. The exemplary device 64 may include other input devices such as a camera 72, as well as an audio input device such as a microphone 74 and an audio output device such as a speaker 76. A biometric reader such as the camera, the microphone or other reader such as a fingerprint reader may also be included. The exemplary device 64 further includes at least one wireless communication device 78. The at least one wireless communication device may include a device suitable for Wi-Fi or cellular communications. The at least one wireless communication device 78 may also include a local RF communication device for providing Bluetooth or NFC communication. Of course these devices are exemplary.

The exemplary device further includes control circuitry 80. The control circuitry is similar to that previously discussed and may include at least one processor 82 and at least one data store like those previously described. The exemplary control circuitry is in operative connection with the component devices of the device 64 as shown. In addition to communicating in the network 50, the exemplary device 64 is also enabled to communicate with other devices in other networks such as network 86. Network 86 may include a printer 88 or other device that is operative to produce data bearing records 90. Such data bearing records may include labels bearing parcel identifying indicia or other data suitable for use in connection with the exemplary embodiments later discussed.

The exemplary network 50 is also in communication with the plurality of portable wireless devices associated with individuals who transport deposit items between depositories. These portable wireless devices schematically indicated 92, 94, 96, 98 and 100 they be used by authorized users to access depositories for purposes of placing deposit items therein or removing deposit items therefrom.

Figure 7:
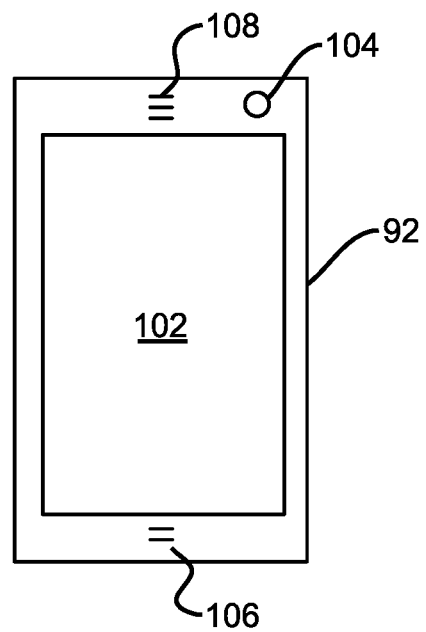
FIG. 7 is a plan view of the portable wireless device that may be used by an authorized user to access the interior area of a depository for purposes of taking deposit items therein for transport.
Figure 8:
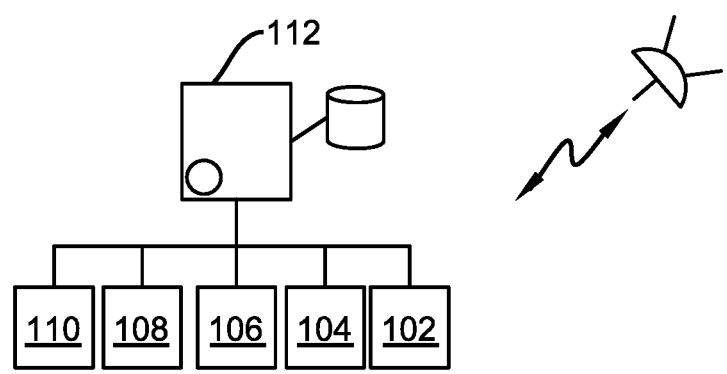
FIG. 8 is a schematic view of circuitry associated with the device of FIG. 7, including the capabilities for tracking the device and deposit items associated with the user thereof.

As represented in FIGS. 7 and 8 the exemplary portable wireless devices such as device 92, that is operated by an individual user who transports deposit items, may include mobile phone devices including an input output device such as a touchscreen 102. Exemplary device 92 may further include a camera 104, as well as a microphone 106 and a speaker 108. It may also include other types of biometric readers and other devices. The exemplary device 92 further includes at least one wireless communication device 110. The at least one wireless communication device 110 may include a Wi-Fi interface, cellular phone interface, Bluetooth, NFC or other wireless interface of the types previously discussed. Further in the exemplary arrangement device 92 includes a wireless communication interface suitable for providing tracking of the device via a global positioning system (GPS). The GPS capability enables tracking the device as well as the user and deposit items associated therewith in a manner that is later discussed. The exemplary device further includes control circuitry 112. The control circuitry 112 includes at least one processor and at least one data store of the types previously described. The control circuitry 112 enables operation of the device 92 in the manner later discussed.

The exemplary network 50 is also in operative connection with portable wireless devices which are operated by entities that are owners of respective depositories. These portable wireless devices schematically represented 114, 116 may be similar in exemplary embodiments to wireless device 64 previously discussed. However such devices may further include circuit executable instructions that additionally provide capabilities for the owner of the depository to receive payments from the operator of the system for the use of their depositories in connection with the storage and transport of deposit items. In exemplary arrangements such payments are made for the storage of deposit items that are placed into the depository by third parties for purposes of having the deposit items transported to an entity other than the entity associated with the particular depository into which the item is deposited.

It should be understood that the network configuration 50 and the devices in operative connection therewith are exemplary. Numerous other types of devices, network configurations and arrangements may be utilized in connection with exemplary embodiments. Further while the exemplary devices operated by users of the system have been generally described as portable wireless devices, it should be understood that other types of stationary or portable computer devices may be operated in connection with the system to carry out the functions described herein.

In exemplary arrangements the central circuitry 60 is operative to include in at least one or more associated data stores 62, data records related to devices that are utilized in connection with the exemplary system. For example in exemplary arrangements the data stores include identifying data regarding each depository and its respective location. The stored data regarding depositories in exemplary embodiments also includes data regarding the entity that is the owner of the depository, and restrictions that the entity who is the owner of the depository may have placed on the use thereof. For example in some arrangements the owner of the depository may restrict use solely to receiving therein or having removed therefrom deposit items that are received or sent by the owner of the depository. Other depository owners may establish rules which allow other entities to provide deposit items into the depository for transport elsewhere, or to receive items in the depository that can be taken from the depository by the authorized recipient entities.

Other exemplary rules that may be established in connection with depositories may include only having the depository available to be accessed by certain transport users, such as users who have achieved a certain security level or performance rating. This may include for example transport users for deposit items who have achieved above a certain rating based on background checks and/or measured metrics for performance, reliability and dependability. Other rules associated with depositories may include restrictions on days of the week and/or times during particular days when entities other than the depository owner, is permitted to access the depository. Numerous different restrictions may be set for depositories by depository owners or the central system circuitry operator for purposes of operating the depository in connection with the system.

In addition stored data regarding depositories may include information related to security features or other features associated with the depository. For example in order to provide secure communication between the central circuitry and each depository, the depository and the central circuitry may have respective public and private key pairs and digital certificates that enable secure communication between the central circuitry and the control circuitry of the respective depository. This enables the control circuitry of the depository and the central circuitry to identify the system originating messages and to be assured of the origin of received messages. In addition the central circuitry and the control circuitry of each depository may include respective programming that enables the sending of instructions or other messages which enable the operation or performance of certain functions. For example the control circuitry of the respective depository may include programming from the central system that is operative to cause the locking or unlocking of the respective lock of the depository in response to the receipt of certain messages and/or data by the depository from the central system. Further in exemplary arrangements the central system may be operative to cause the control circuitry of a respective depository to operate the plurality of reading devices therein for purposes of determining the amount of space that is currently available in the interior area of the depository. Such functionality may enable the central circuitry to determine the ability of the particular depository to accept therein a deposit item having a particular size that may be available for deposit into the depository.

Further in exemplary embodiments the central circuitry may operate in accordance with its programming to maintain data corresponding to the indicia associated with deposit items that are currently positioned in the interior area of each depository. Further, in exemplary arrangements the central system may communicate with a respective depository so as to cause the control circuitry thereof to deliver to the central circuitry, data corresponding to activities that have been conducted at the depository. This may include not only the indicia usable to identify deposit items currently therein, but also historical record data related to deposit items placed into the depository and/or deposit items removed therefrom, and data associated with the users and times associated with each respective activity that has occurred. In exemplary arrangements each depository may also operate to have its control circuitry store images associated with activities that occur at the depository. This may include images of each user who places a deposit item into or removes a deposit item from the interior area of the depository. Such image data may also include item identifying indicia included on each item that is placed in or removed from the depository by the authorized user as well as other data associated with each event or activity that has occurred. Instructions communicated from the central circuitry may be operative to cause the control circuitry of a respective depository to send image data corresponding to the captured images associated with the activities that have occurred at the depository. This may further enable documenting the deposit or removal of deposit items as well as facilitate resolving any discrepancies which may occur. Of course these functions and capabilities, and stored record data of the central circuitry and each depository is exemplary, and in other embodiments other approaches may be used.

Further in exemplary embodiments the central system circuitry 60 is operative to include in the at least one data store 62 information regarding the devices and authorized users who utilize the depositories included in the system. For example in an exemplary embodiment the central circuitry is operative to include the information shown in FIG. 9 for the devices such as devices 92, 94, 96, 98 and 100 that are operated by the authorized users who access the depositories and transport deposit items. In the exemplary arrangements each of the authorized users has included in the data store associated with their portable wireless device, identifying data that is usable in conjunction with the depositories to indicate that the user of the device is an authorized user. Such data may include for example, token information which can be utilized to identify the user as an authorized user. Such token information may include digital information that can be correlated through operation of the central circuitry with the identity of the particular individual that is associated with operation of the particular device. In addition such token information may include other types of data which can be used for identification purposes. Such other types of data may include for example, user biometric data such as fingerprint data, iris scan data or other data that comprises record data that is uniquely associated with the user.

Further in other exemplary arrangements stored data regarding users may include other record data which may be utilized in connection with operation of the system. For example in systems that utilize card data for purposes of accessing depositories, the record data maintained by the central circuitry may include the data corresponding to the respective user's card data and other associated data for the respective user. This enables the system to compare the data received through the at least one input device of a depository, to stored data so as to identify the person seeking access to the depository as an authorized user who is appropriately authorized to have access thereto. Of course the approaches described in connection with the authorized users are exemplary, and in other embodiments other approaches may be used.

Figure 9:
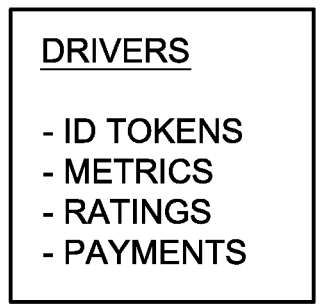
FIG. 9 is a schematic view of types of data bearing records included in an exemplary system related to authorized users who transport deposit items between depositories.

Further as described in connection with FIG. 9, the record data associated with devices operated by users who transport items may include information regarding payments to such users. In the exemplary system the users who transport items between the depositories are paid for the transport services. The services are based on the information regarding the particular depository item that is transported, the size of the item, the weight of the item, the distance and timing associated with such transport and other factors. The exemplary data that is stored by the central circuitry further includes data regarding payments that are made to the individuals who perform the transport services. Such payment data may also include data such as account data associated with the user which enables the making of the payments to the user for the services provided. This may include for example, information regarding a PayPal account, a Venmo account, a bank account, an electronic stored value account or other accounts into which appropriate payments to such users may be made.

Further in the exemplary arrangement the central circuitry is operative to include data regarding the activities that are performed by each respective user who transports deposit items in connection with the system. Such data may include metrics which include information on the timeliness and reliability of the particular individual. For example as later discussed, transport activities associated with particular deposit items are assigned by the system to the particular authorized user, and the activity is reserved to the user for a particular time. In cases where the particular user that is initially assigned to the activity does not perform the activity within the allotted time, the system is operative to reassign the activity to another user. Such events where an activity is not performed by a user is considered significant to the user's performance. Likewise in situations where an authorized user has taken longer than would normally be expected to accomplish the transport of the deposit item to a depository destination, such factors would also be significant in terms of the user's associated metrics. Losses of items and cases of misdirected deposit items are also significant metrics. These and other metrics are recorded through operation of the central system circuitry with regard to each authorized transport user.

Further the exemplary central system circuitry is operative to apply ratings to each authorized user based on the metrics that are associated with the user's performance. Such user ratings may be utilized in connection with screening authorized users for purposes of accessing certain depositories and/or handling certain types or values of deposit items. Such ratings may also be utilized in connection with determining the rate that is paid to the user for the transport activities that are performed. Of course these categories that are represented in FIG. 9 are exemplary and in other embodiments other or additional information regarding such users may be stored and evaluated through operation of the central circuitry.

Figure 10:
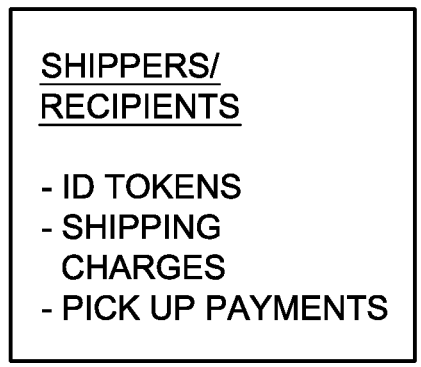
FIG. 10 is a schematic view listing types of data bearing records included in an exemplary system associated with depositories related to authorized users who place deposit items in depositories for subsequent transport and/or who remove items from depositories for purposes of receiving such items.

FIG. 10 shows exemplary records and data items that may be associated with users and their associated devices that place items into depositories for purposes of requesting deliveries to other depositories and/or that receive items from depositories. In the exemplary network arrangement this data would be associated with devices 64, 66 and 68. As is the case in connection with individuals and devices that provide transport services, the data associated with these devices include ID tokens or other identifying record information that can be utilized to reliably identify the user or device is one that is authorized to access the depository. As the individuals that provide the functions of providing deposit items to be transported to the depositories will generally be required to pay for the transport services, the central circuitry includes data for such users that include account data for assessing charges associated with payments for shipments. This may include credit card accounts, bank accounts, PayPal accounts or other suitable accounts from which payments may be made.

Further in the exemplary system individuals in this category may choose to travel an extended distance to a depository in order to receive a deposit item that would otherwise be handled by a user that is paid to transport the item to a destination depository substantially closer to the recipient. In the exemplary system if the recipient chooses to conduct a substantial portion of the transport by taking the item from a depository that is remotely located from the destination that the person arranging for shipment has paid to have the item delivered to, then the central circuitry is operative to compensate the recipient for the transport activity associated with picking up the item from the remote destination. As such the exemplary central circuitry includes data regarding account information which can be credited for pickup amounts to which the authorized user receiving an item may be entitled. This account information may include account information for accounts which can be credited with value to the recipient for transport and pick up of deposit items. Of course it should be understood that the data types shown for this category of authorized user and their associated devices in FIG. 10 is merely exemplary of some items of information which may be included in records of the central circuitry.

Figure 11:
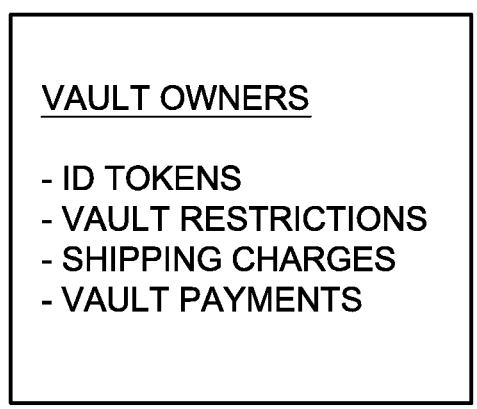
FIG. 11 is a schematic view listing types of data bearing records included in an exemplary system which relate to entities that are the owners of the exemplary depositories.
Figure 12:
FIGS. 12 through 28 are a schematic representation of logic flow carried out by the control circuitry of the exemplary depository, associated central system circuitry and devices operated by authorized users who place deposit items into and/or remove deposit items from the depositories.
Figure 13:
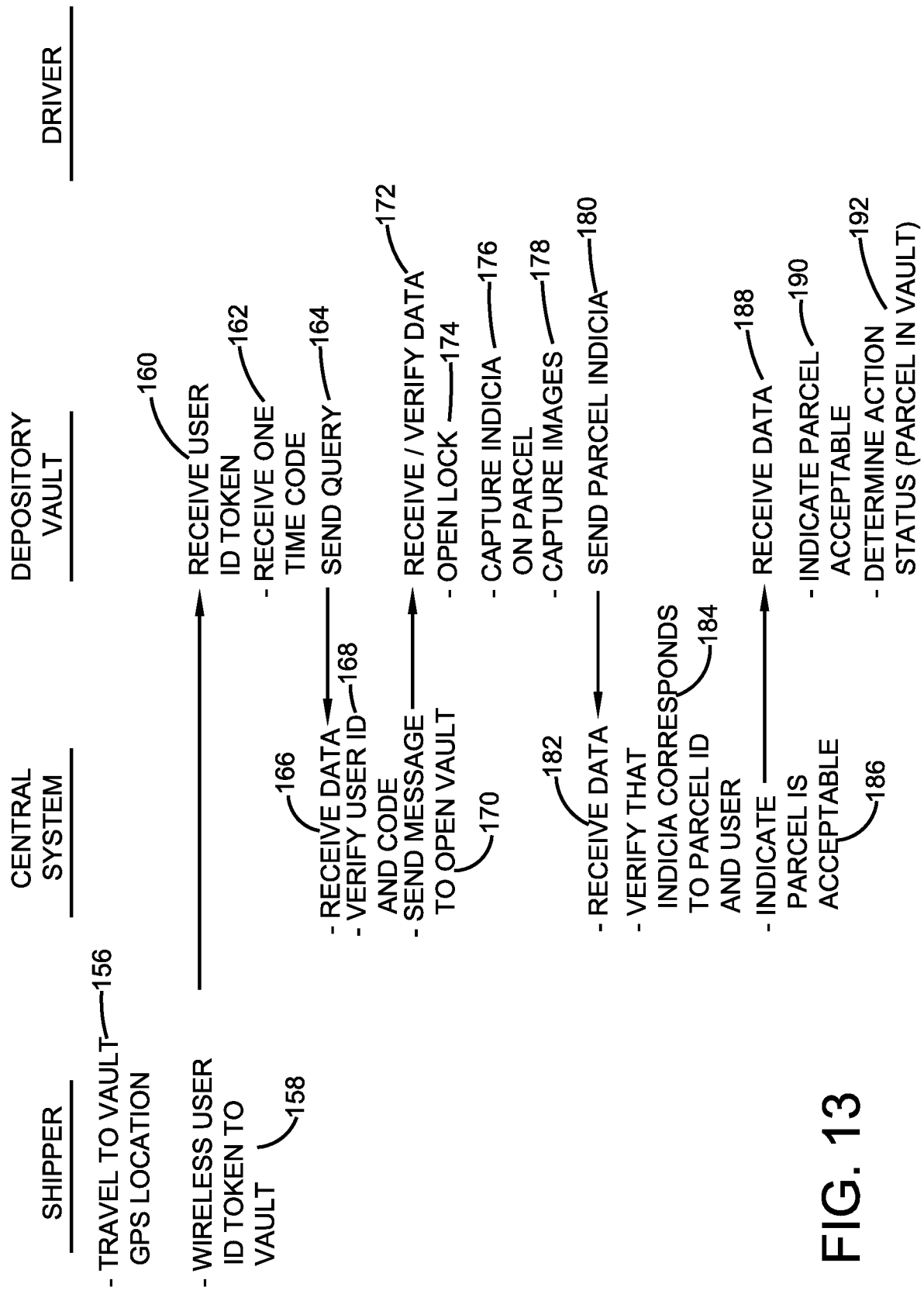
Figure 14:
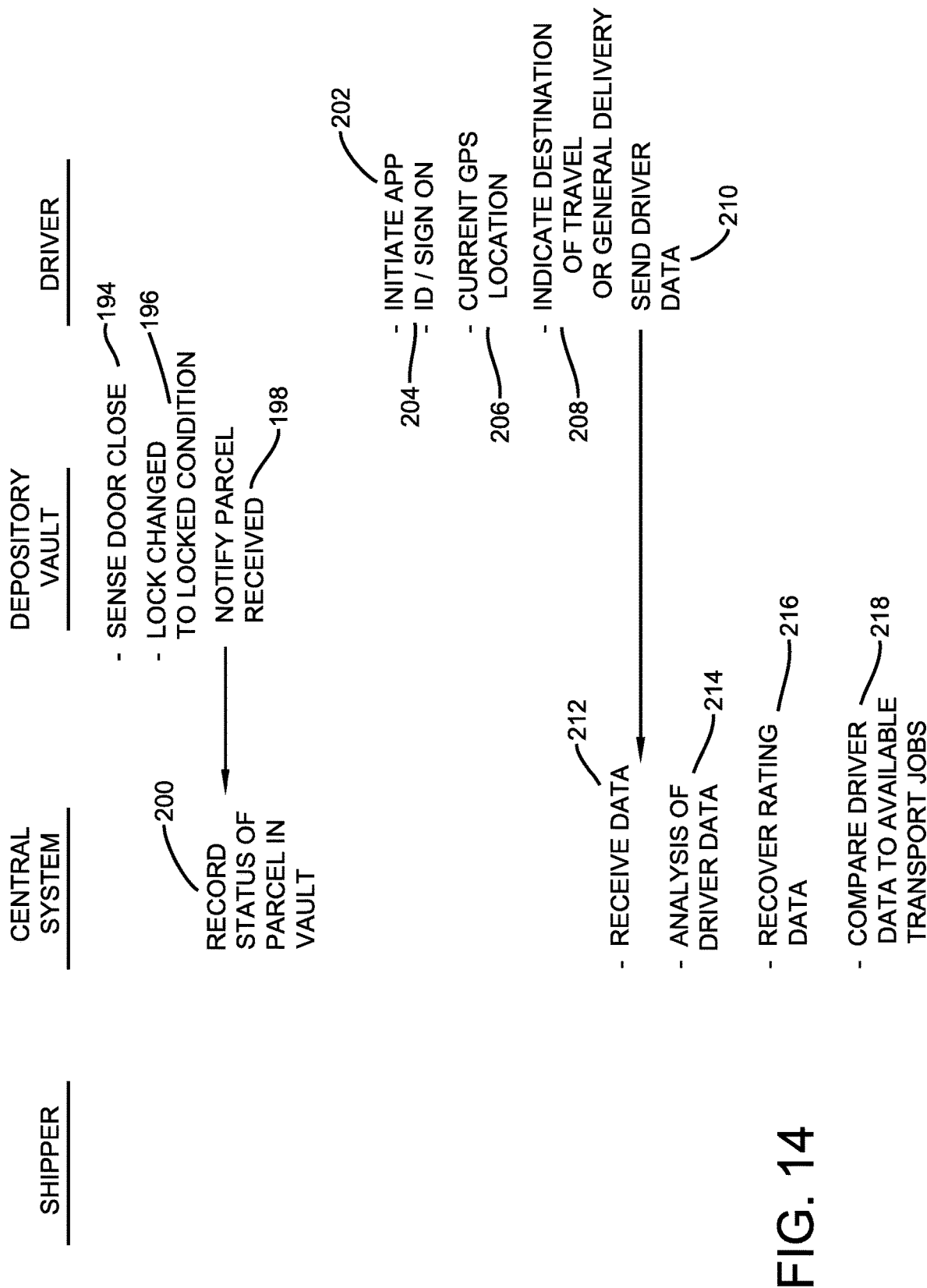
Figure 15:
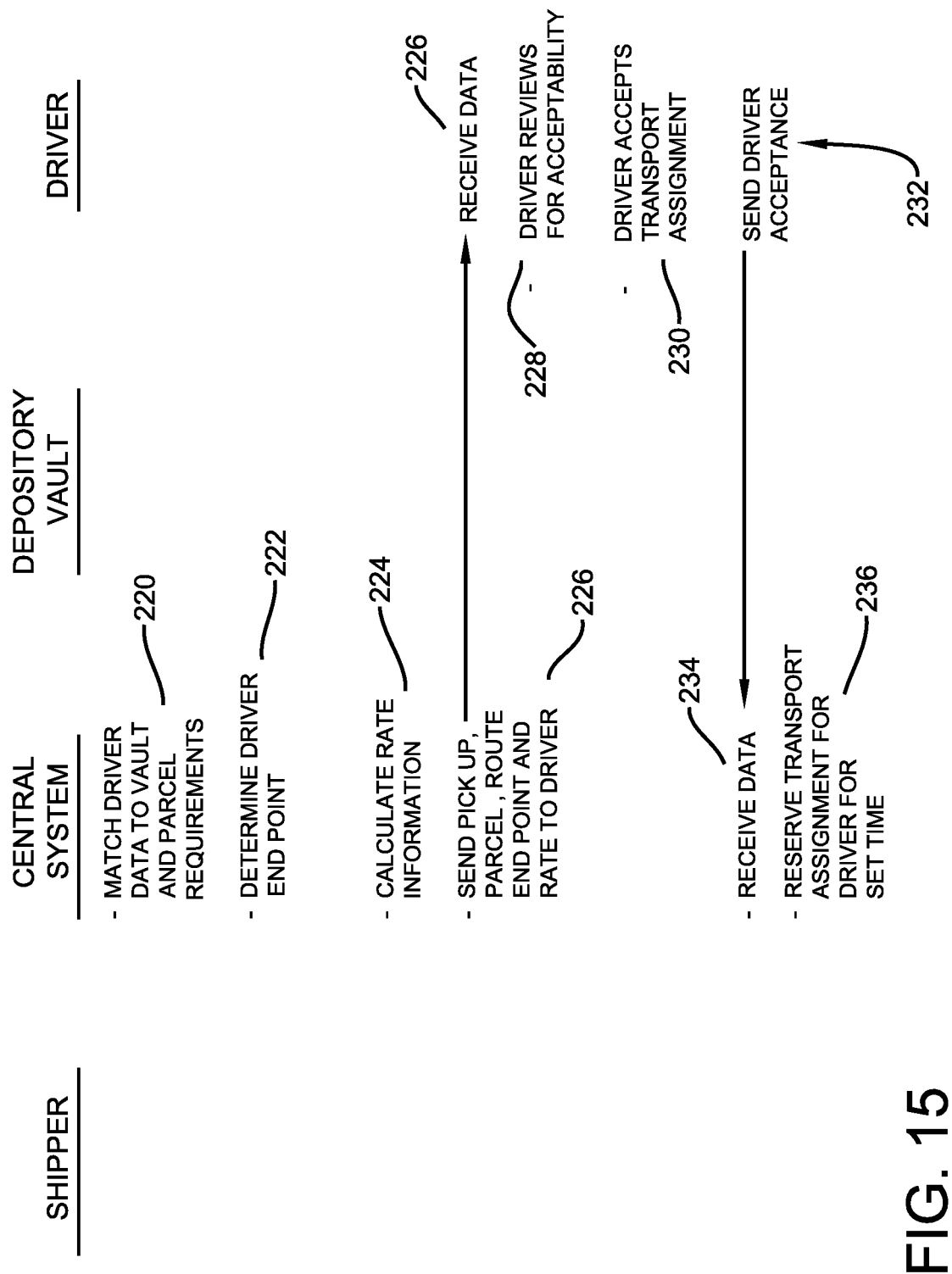
Figure 16:
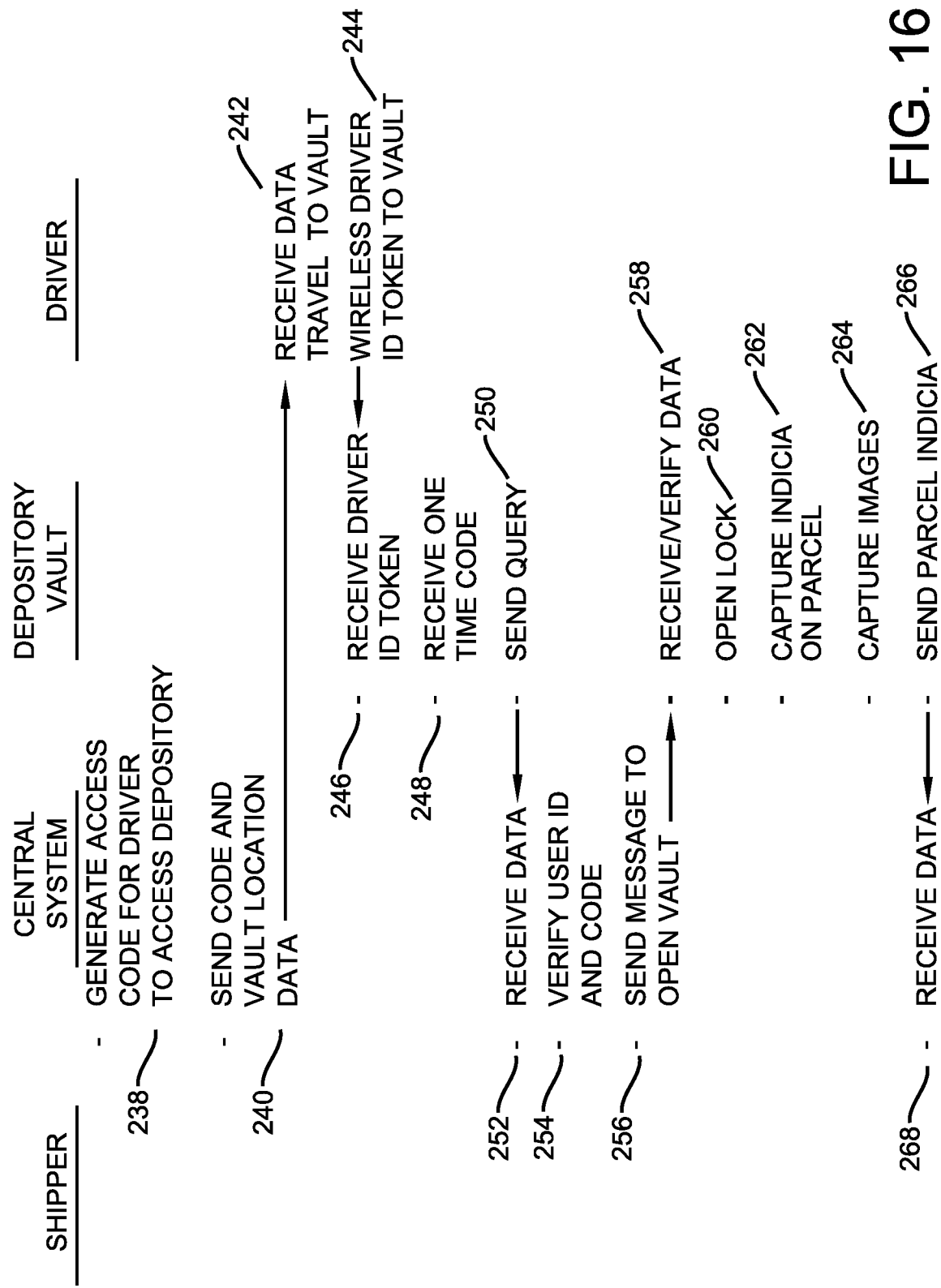
Figure 17:
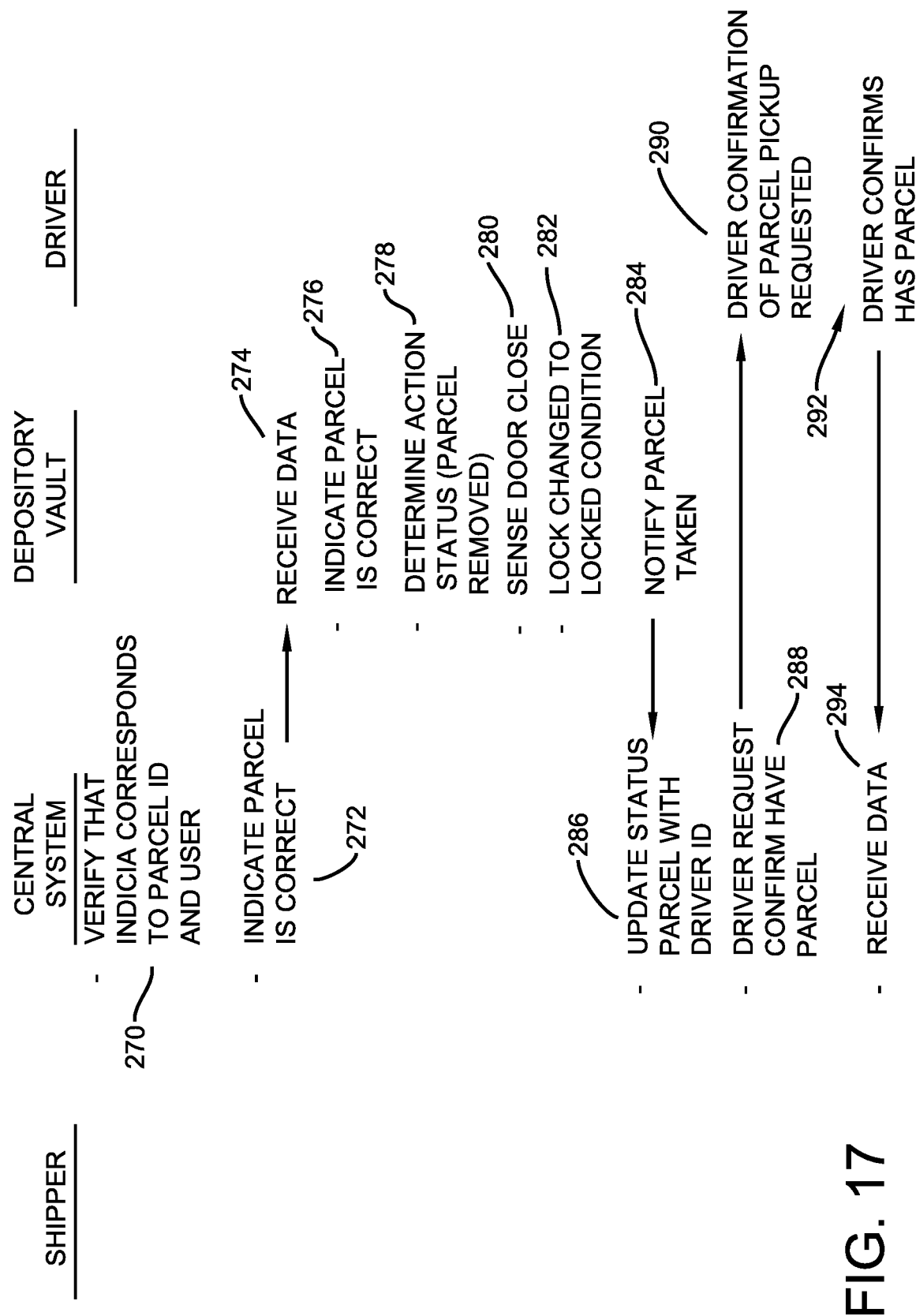
Figure 18:
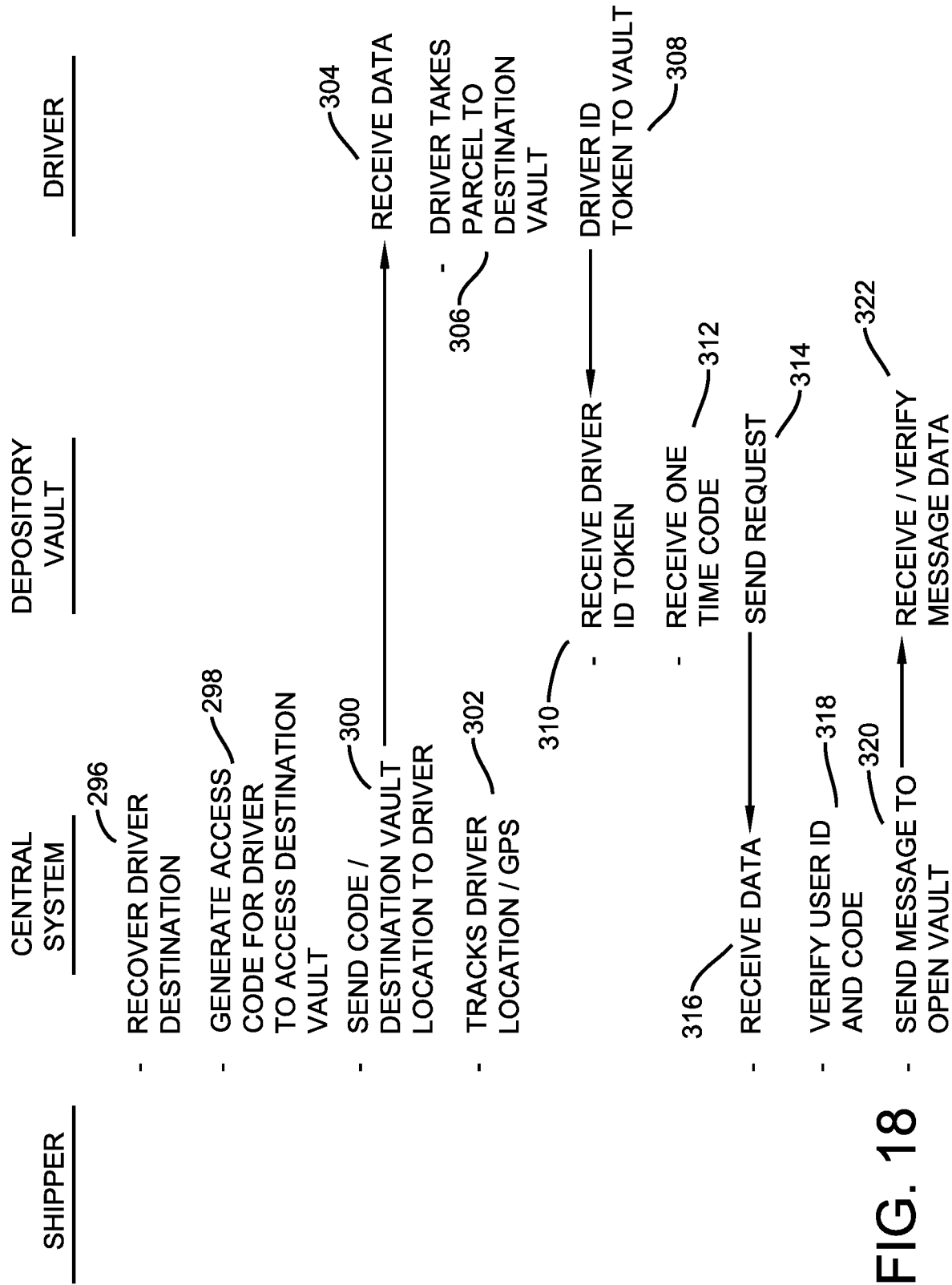
Figure 19:
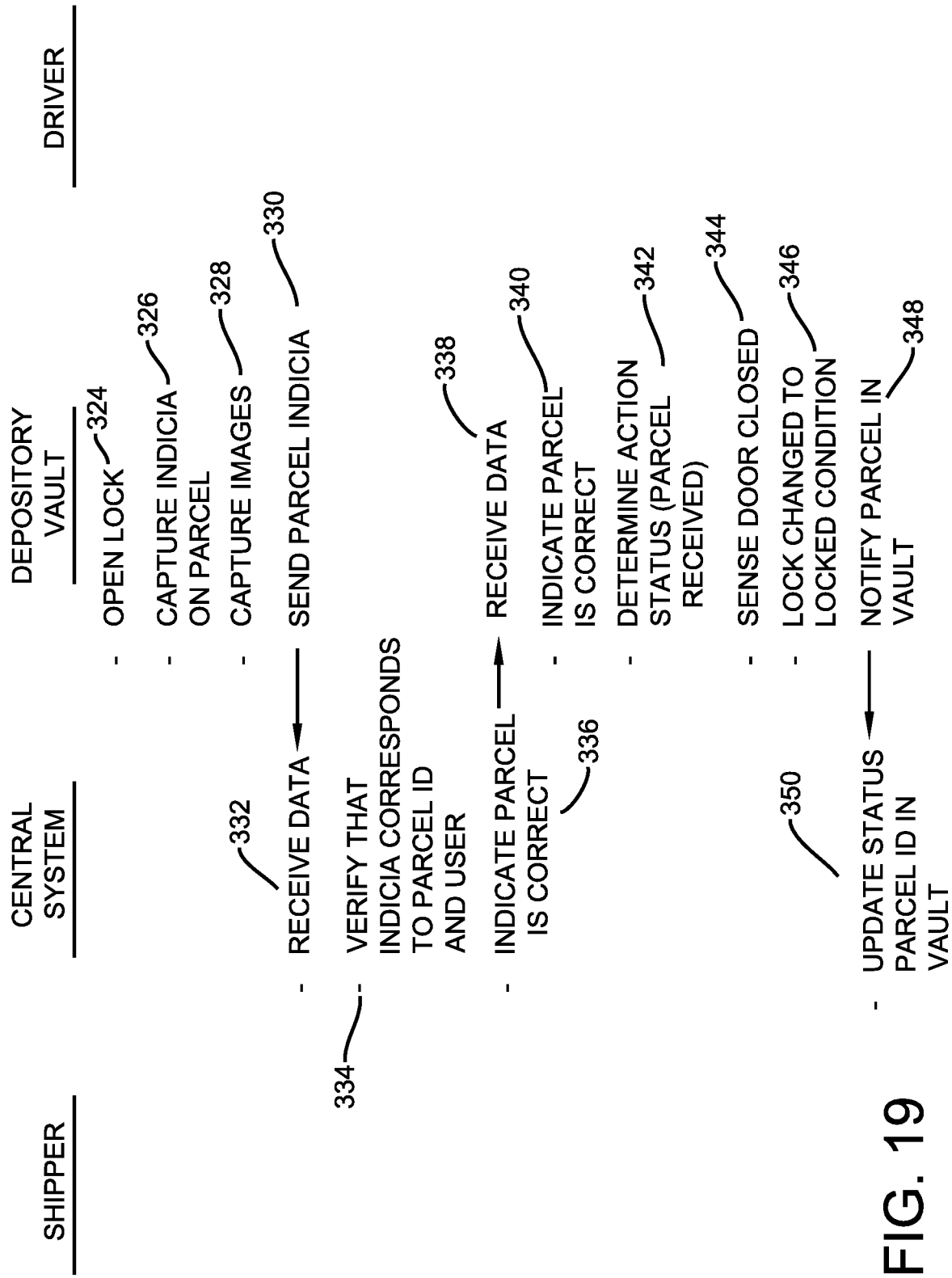
Figure 20:
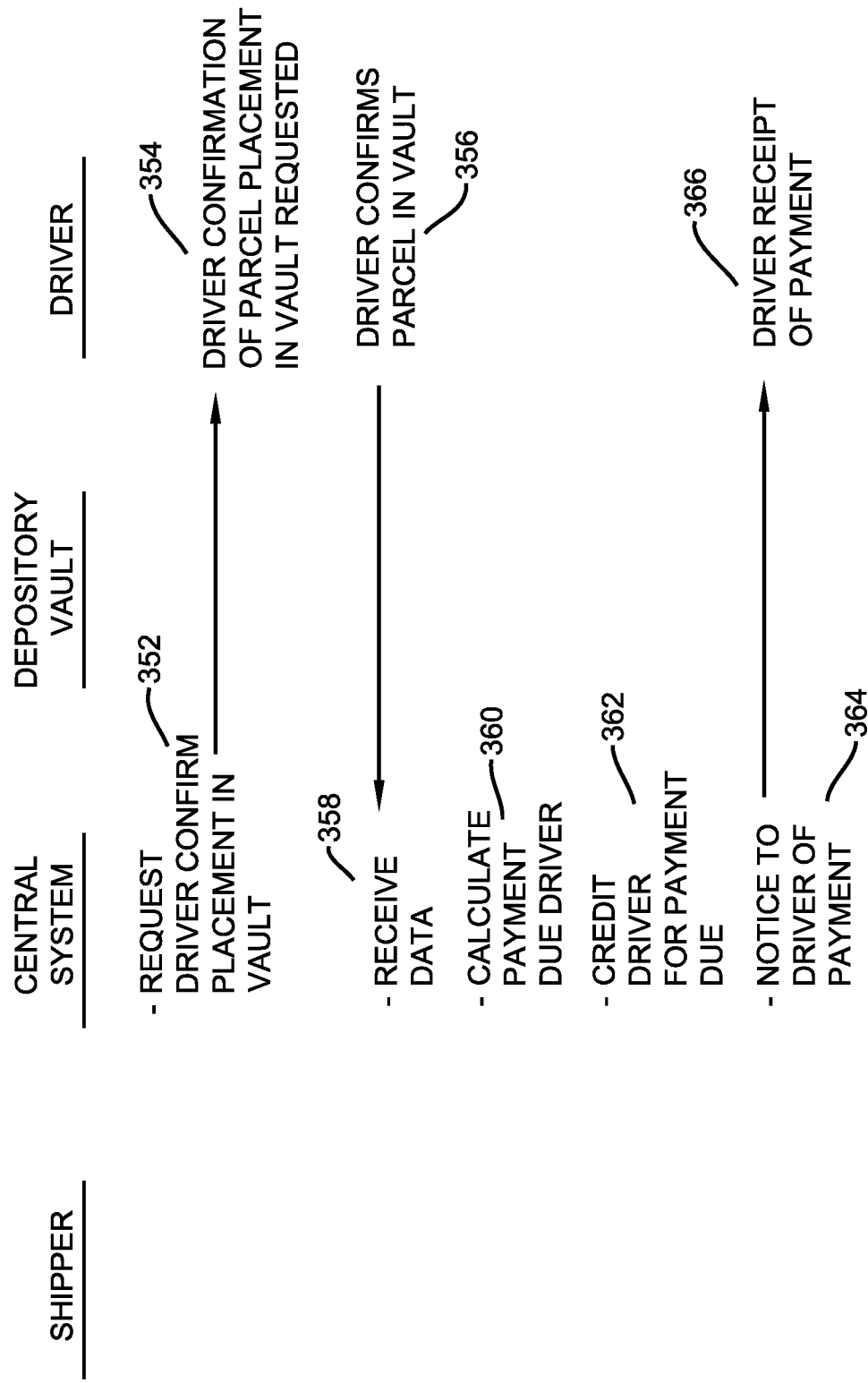
Figure 21:
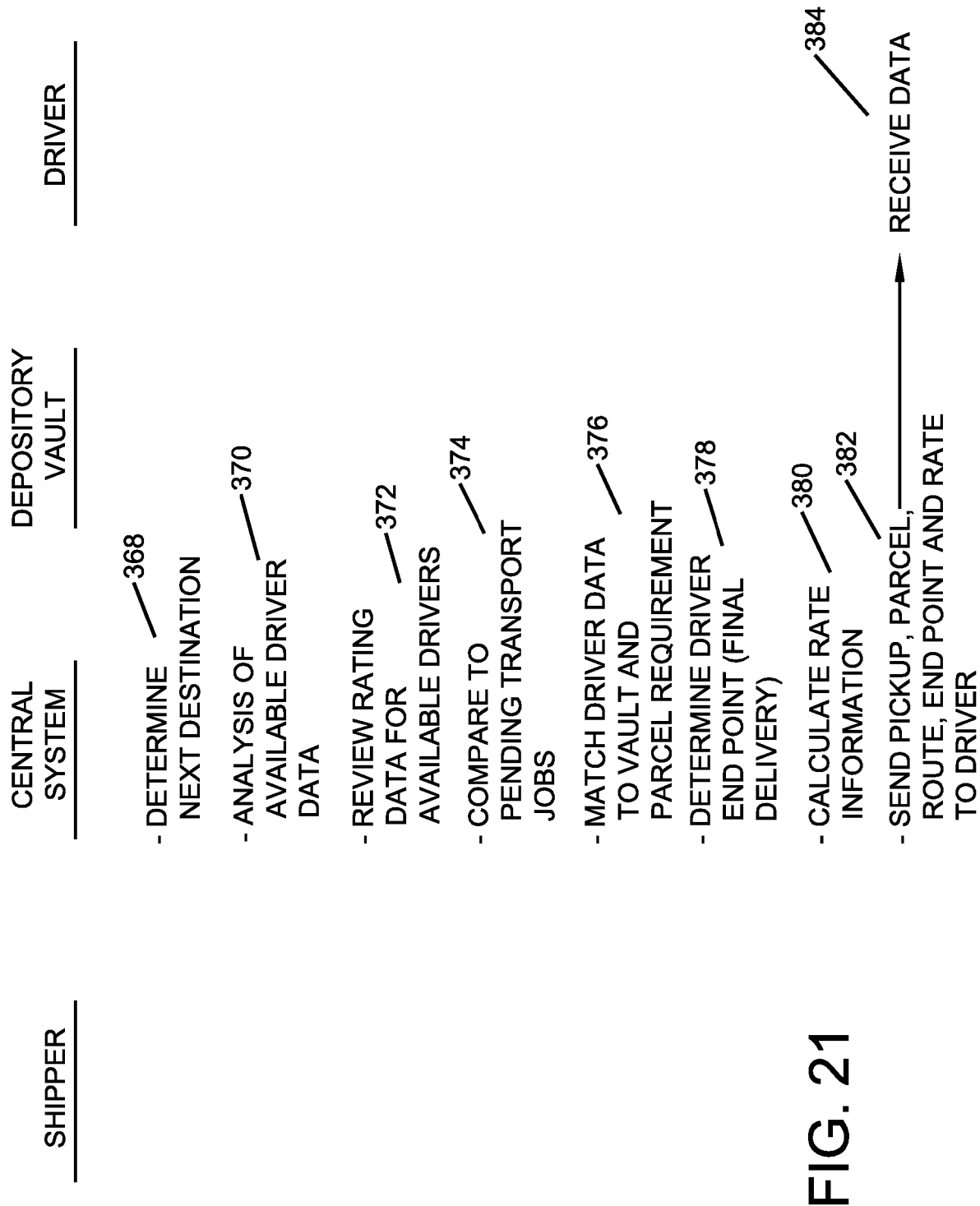
Figure 22:
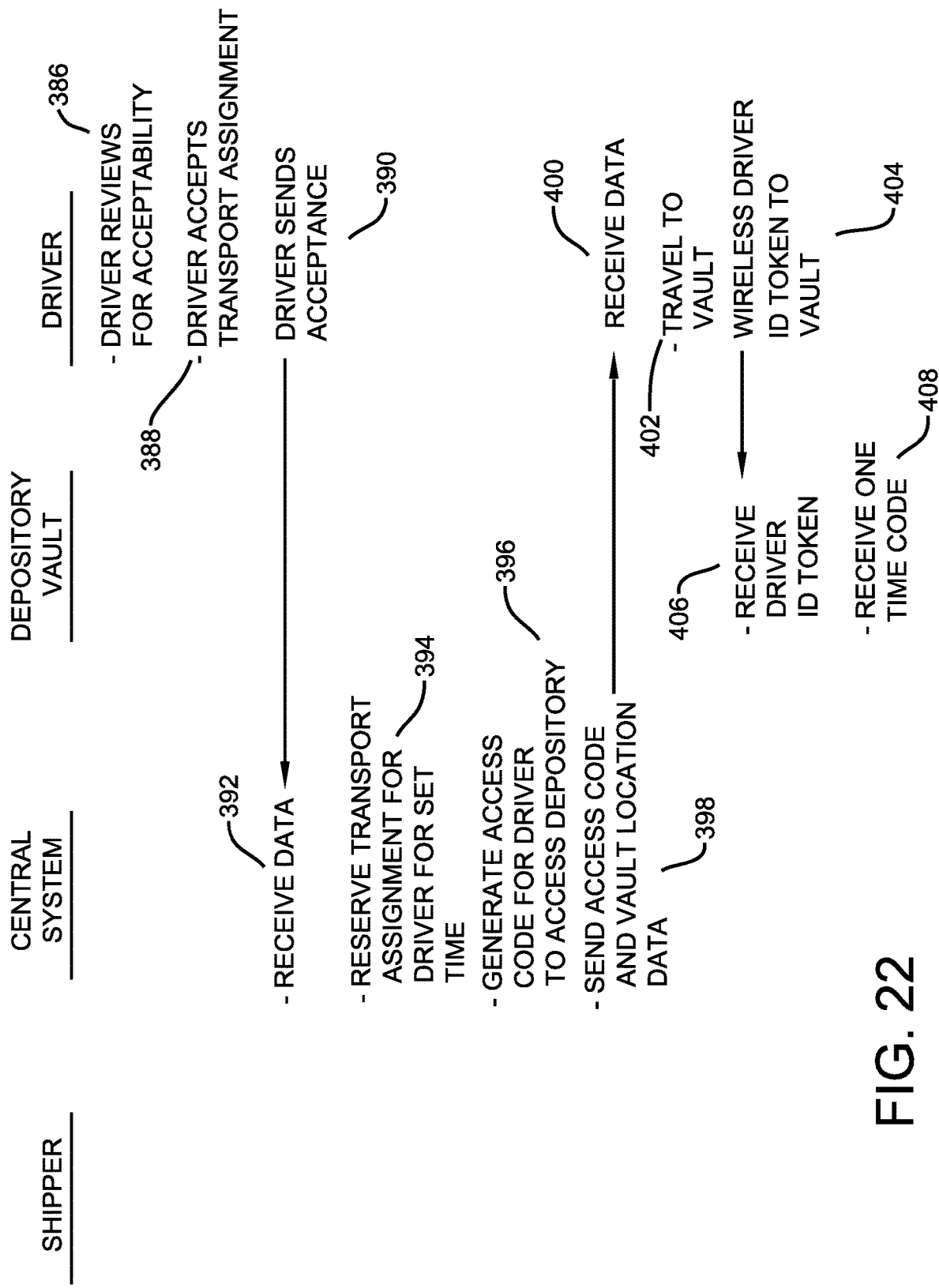
Figure 23:
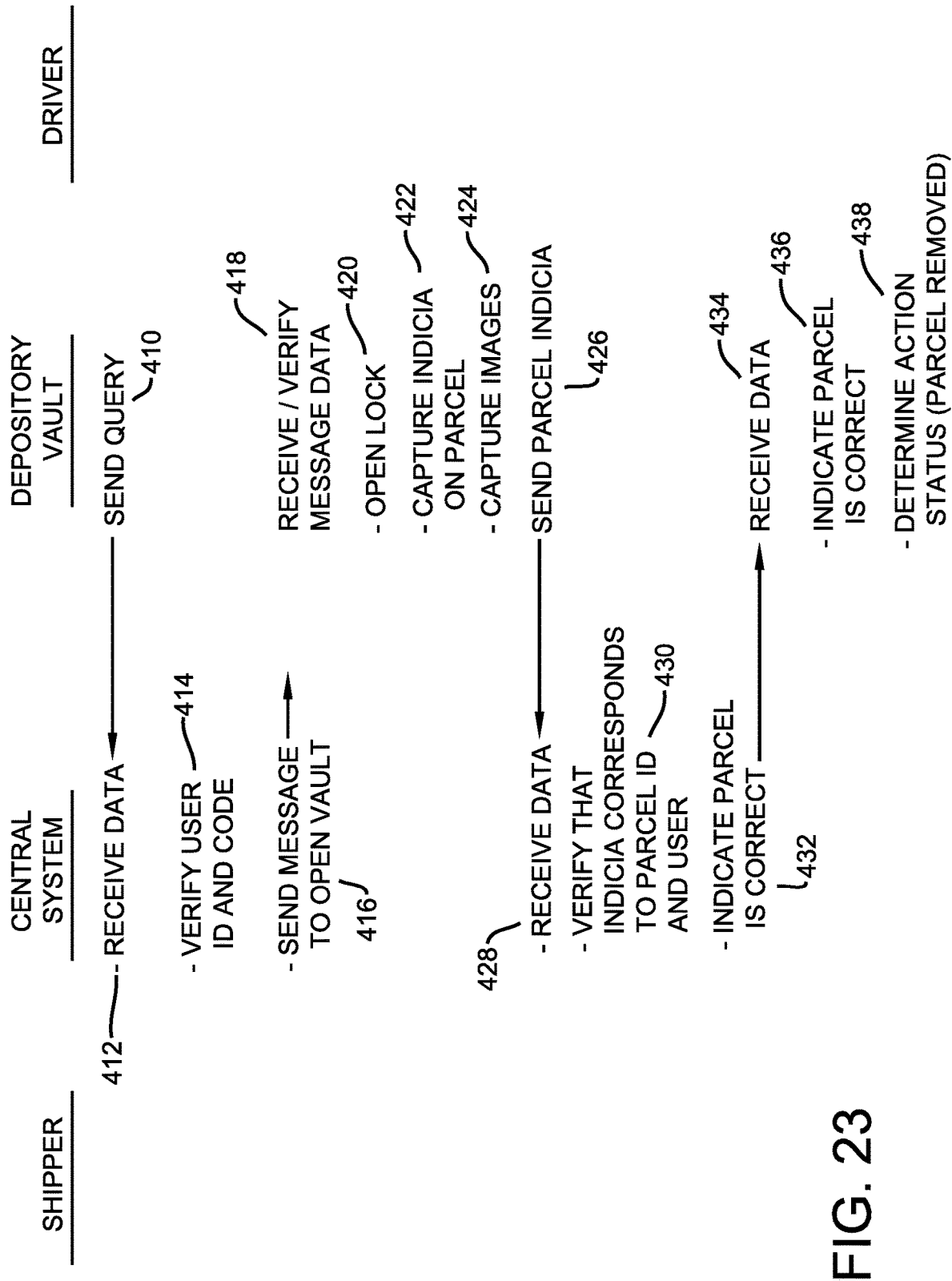
Figure 24:
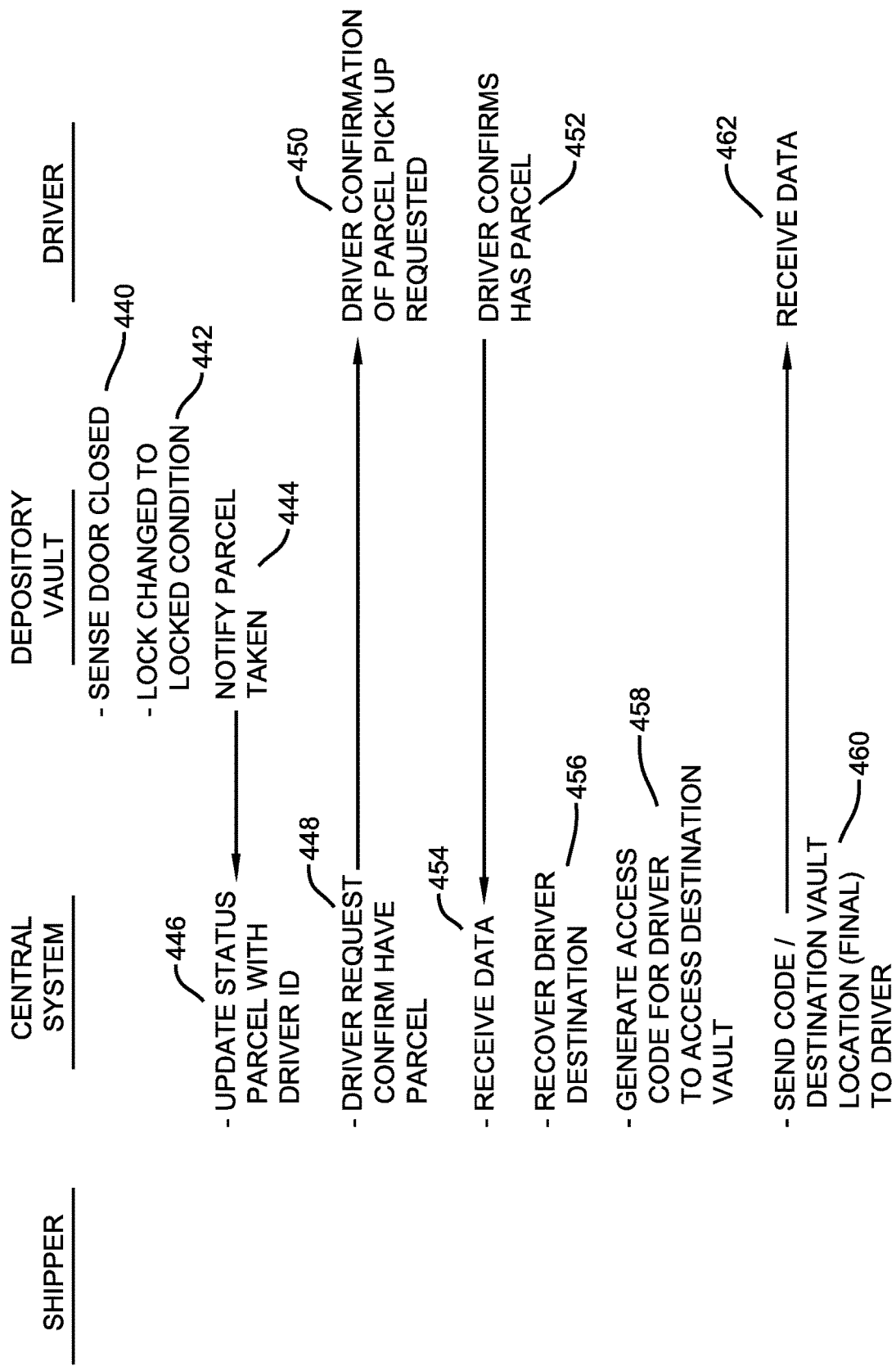
Figure 25:
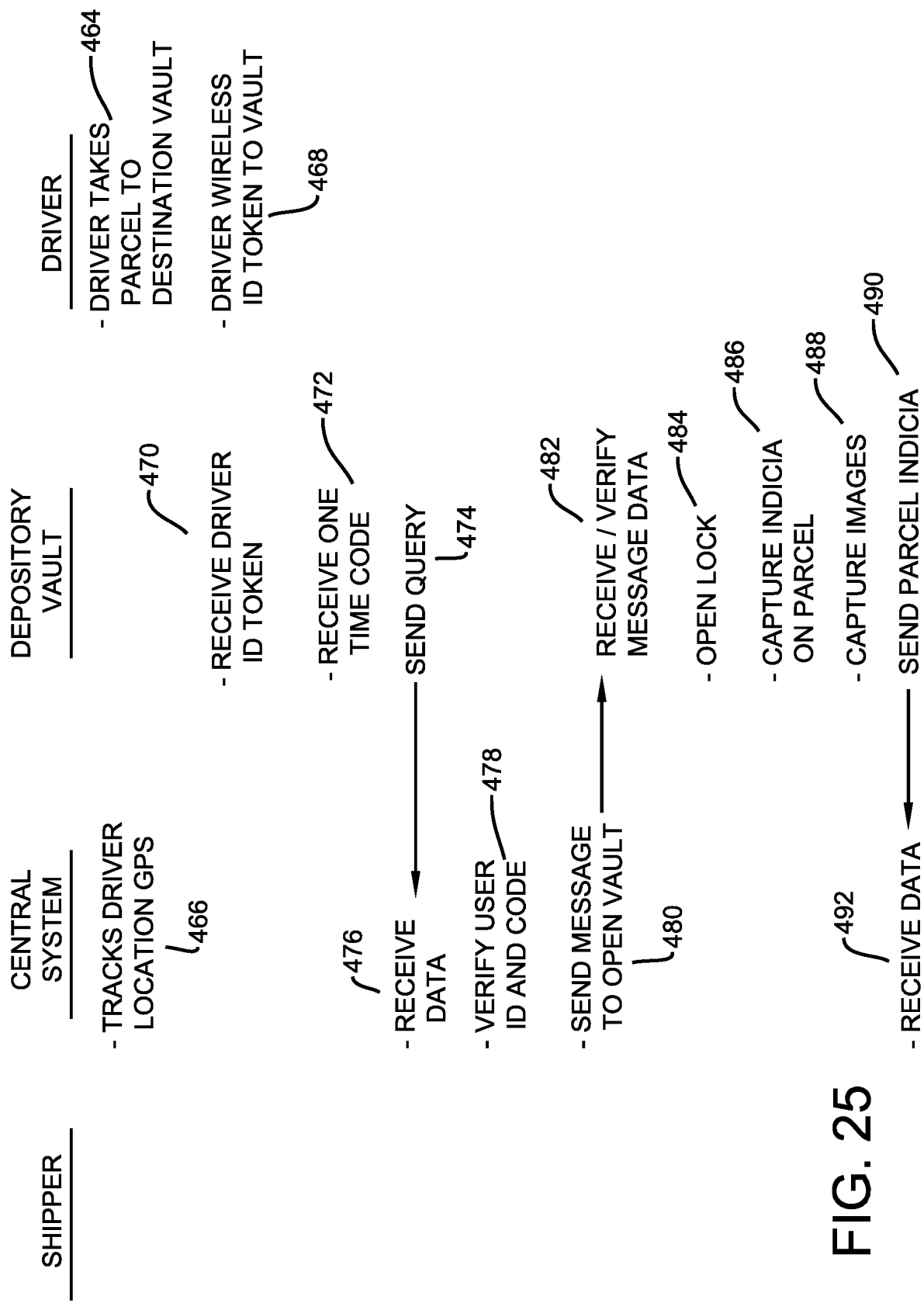
Figure 26:
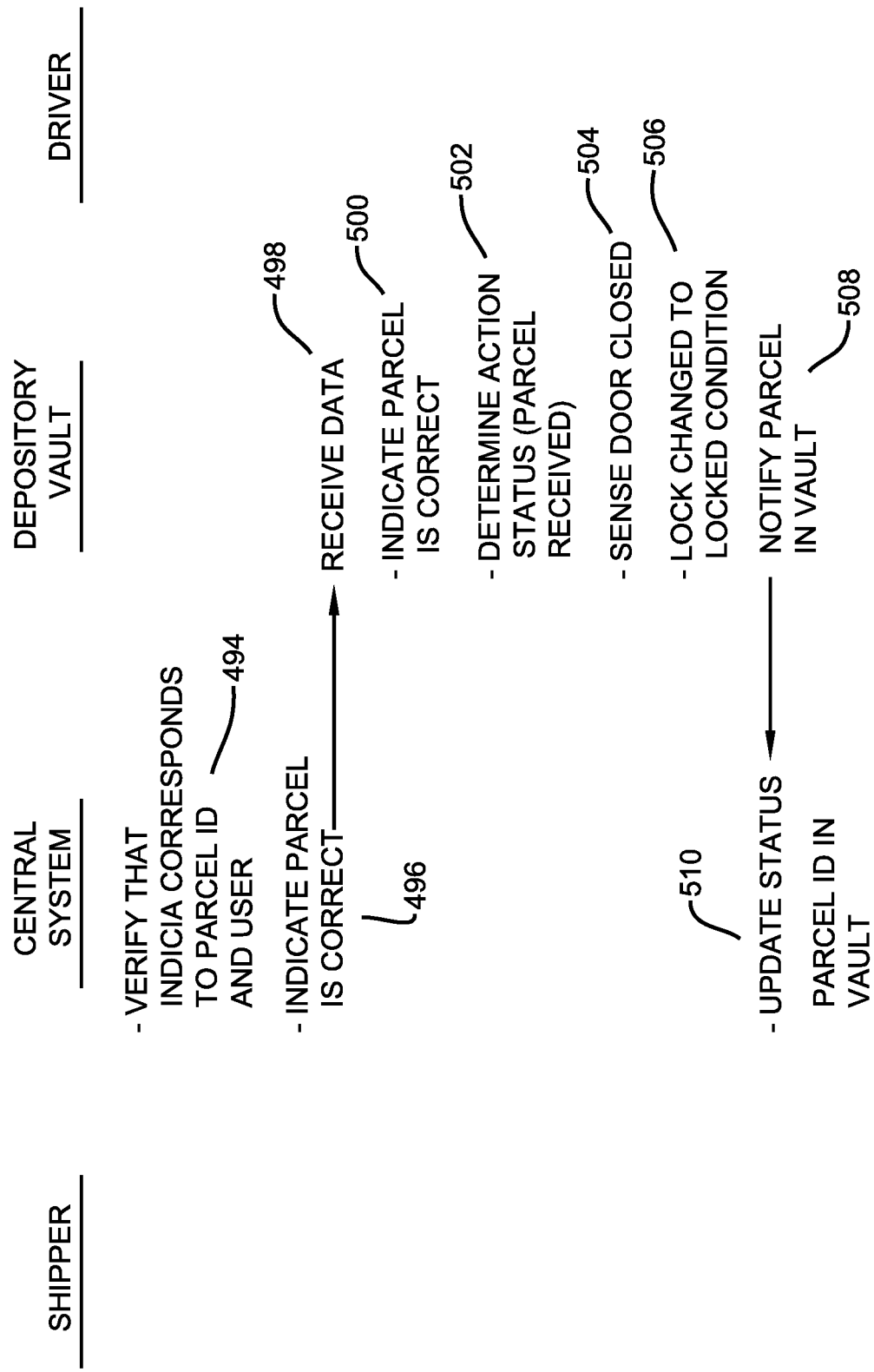
Figure 27:
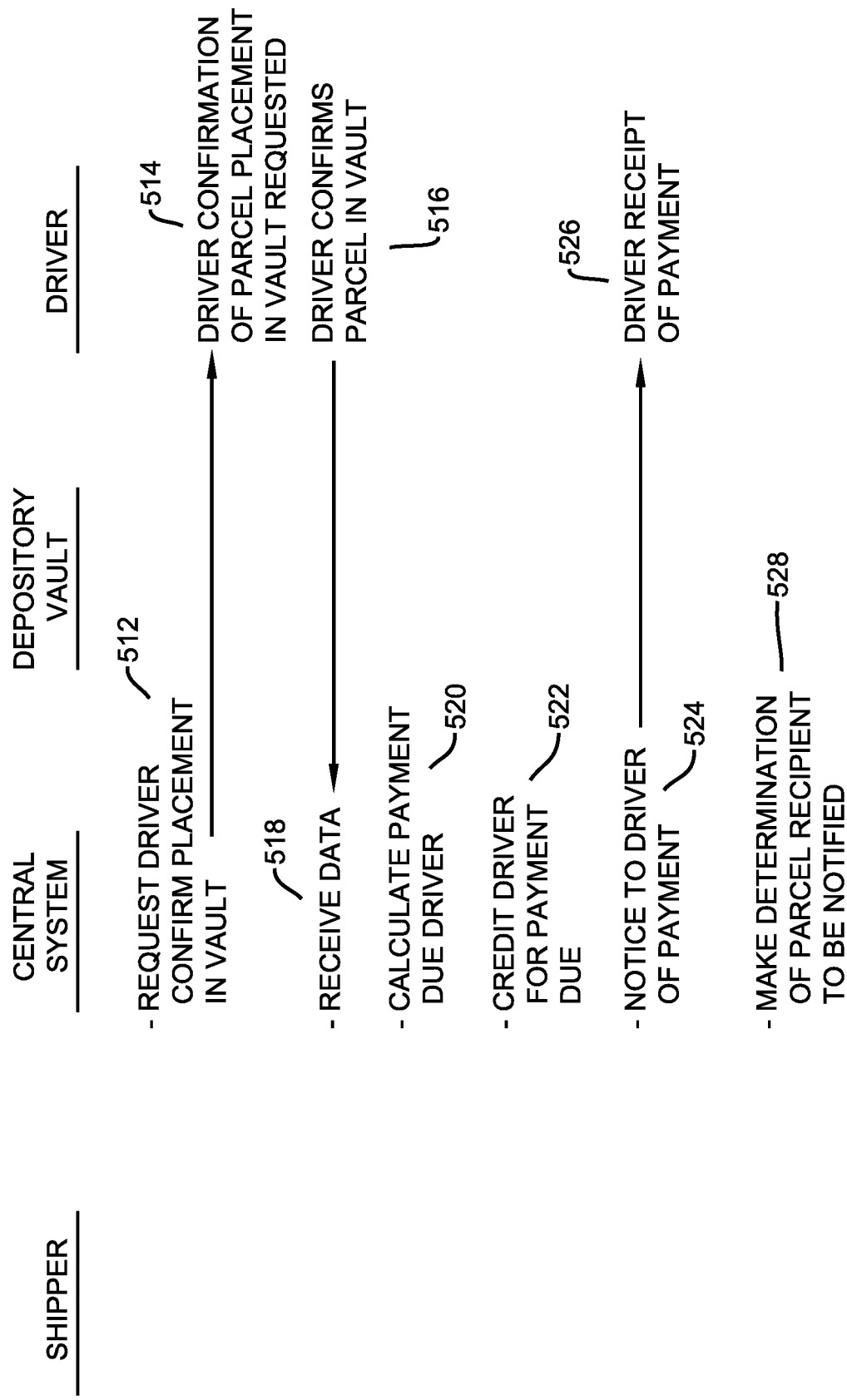

FIG. 11 shows exemplary record data that is associated with owners of depositories and their associated devices. The data shown in FIG. 11 would generally be associated with the devices 114, 116 that were previously discussed in connection with the exemplary network 50. Similar to other devices, the devices associated with depository owners would include the identifying information which identifies the user as an authorized user. In addition in the exemplary arrangement the records associated with the depository owner includes data regarding the restrictions on the depositories such as those previously discussed. The exemplary central circuitry is operative to associate the depository owner with the respective depository that is owned by the depository owner and to cause the restrictions set by the owner for the depository to be applicable to the records associated with the depository in the one or more data stores of the central circuitry.

Further in the exemplary arrangements the depository owners are generally entities that engage in sending deposit items for transport and receiving deposit items. As such the data associated with the depository owners includes account information corresponding to accounts which can be assessed for charges associated with transport of deposit items to remote depository destinations. Further in exemplary arrangements the central circuitry is operative to compensate depository owners for deposit items that are placed in the depository of the depository owner by other authorized user individuals for purposes of transport to other depositories. In the exemplary arrangement the depository owner is compensated for the use of their depository by such third parties. The exemplary system is operative to include in the data associated with the depository owners, account information concerning accounts that are credited through operation the central circuitry for the use of the depository by other authorized entities.

Of course the types of record data shown as maintained by the central circuitry for the different types of devices and users associated with the system, is exemplary. Additional types of information will generally be stored in association with the various types of devices and users to facilitate operation of the system and to provide record-keeping and tracking for the activities that are carried out in connection therewith. Further as can be appreciated, the central circuitry is operative to store data associated with the whereabouts of deposit items that are moving through the system at all times, and to track the status of depositories, and individuals who provide transport for the items, such that the whereabouts of each deposit item throughout the term of its inclusion in the system can be determined at all times. In exemplary arrangements the central circuitry is operative to estimate arrival times for depository items at destination depositories and makes such data available to users responsible for sending the items and recipients Further historical information on each deposit item is also maintained for a programmed time. To assure that any errors or lost situations can be tracked, investigated and remedied, tracking and image data can be accessed through the central system circuitry as well as from each of the respective depositories.

A schematic representation of the logic flow that is carried out through operation of the central circuitry, the depositories and the portable wireless devices of entities that provide, transport and receive deposit items, is shown in FIGS. 12 through 27. This exemplary logic flow of each of the devices involved is exemplary and is described in connection with an example that is intended to be representative of the operation of the various devices. Of course numerous other features and operations may be utilized in connection with exemplary embodiments.

The example of the logic flow commences with an authorized user of the system who wishes to have a deposit item transported to a remote destination operating their respective portable wireless device such as wireless device 64. In the exemplary logic flow the entity wishing to have the deposit item transported may be referred to as a shipper for purposes of simplicity in connection with this particular example.

As represented in a step 118 the individual wishing to have a deposit item transported operates their associated device such as device 64 to provide inputs which indicate that they wish to have an item transported. In a next step 120 the user operates the device to provide inputs which are usable to identify the user as an authorized user of the system. In a next step 122 the user is operative to provide inputs to their device which indicates the payment method that will be utilized to make payment for the transport of the deposit item. In exemplary arrangements this may include selection from a menu to indicate the type of payment or account that the user wishes to utilize in connection with the deposit item. The user may also be required to provide information or respond to certain questions regarding the item. These questions may include providing information regarding whether the item is flammable or otherwise hazardous. The individual may also be required to indicate whether the item contains perishable or fragile material. The user may also be required to provide information regarding the weight of the item and/or the value of the item. Of course these queries are merely exemplary.

In a step 124 the user operates the device to indicate an address which corresponds to the origin for the transport of the deposit item. This may include the user's business address or other address. In some arrangements it may include a business address associated with the particular depository into which the deposit item will eventually be placed for purposes of initiating the transport activity. In a step 126 the user inputs to the device address information for the point of delivery of the particular deposit item. This may include an address associated with a remote depository that is associated with the entity that will receive the deposit item. Alternatively in other arrangements the delivery address may include an address associated with an entity that does not have a dedicated depository. In such cases the delivery address may include information regarding an authorized user of the system that is enabled to access a depository is located in proximity to them for purposes of receiving the deposit item to be transported.

In the exemplary arrangement the user wishing to arrange for transport of an item may wish to pay an incentive fee in order to have the item delivered more promptly or under certain circumstances. In the exemplary arrangement the programming associated with the user device enables the user arranging for transport to apply an incentive for particular delivery parameters or timing that is associated with the particular deposit item. This is represented in a step 128. Of course if the user does not wish to apply an incentive, the programming associated with the device will cause the standard rates set through operation of the central circuitry to apply.

The exemplary programming associated with the user's device includes the capability to capture images of the deposit item such that the size of the deposit item can be assessed. This is represented in a step 130. Assessing the size of the deposit item is useful for purposes of enabling the central circuitry to determine depositories where sufficient space is available in the interior area for purposes of receiving the deposit item therein at the present time. This may be done in the manner previously discussed using the reading devices that are included in the respective depositories. The size as well as weight can also be factors in determining the charges for transport of the deposit item.

Once the information has been input by the user to the device, the information regarding the request to transport the deposit item is submitted to the central circuitry as represented in a step 132. The central circuitry is then operative to verify the identifying information associated with the user that has submitted the request. This is represented in a step 134. This may include comparing user identifying data stored in the user device with stored data associated with authorized users by the central circuitry. The central circuitry is also operative to verify that the user who has submitted the request has indicated a suitable payment method associated with the central system in order to make payment for the transport of the deposit item. This is represented in a step 136.

The central circuitry then operates to assign a parcel ID to the particular deposit item as represented in step 138. The data provided by the user regarding the origin and delivery addresses for the transport of the deposit item is also stored in at least one data store associated with the central circuitry as represented in step 140. The central circuitry is then operative responsive to the origin address information to resolve the depository that is considered the most suitable for receipt of the deposit item. This is represented in a step 142. Generally the depository will be the depository located in closest geographical proximity to the user wishing to have the deposit item transported. However, in order to assure that space for the deposit item is available in the nearest depository, the central circuitry operates as represented at a step 144 to communicate with the initially selected depository to verify that sufficient space is available to accept a deposit item of the size that was determined at step 130. If such space is not available, the central circuitry operates to determine an alternative available depository that has the space available to receive the deposit item therein.

As represented in a step 146, once the depository for receiving the deposit item is resolved, the central circuitry operates to generate a one-time code to be input by the authorized user for purposes of accessing the depository. In a step 148 the central circuitry is then operative to send the depository location information and the code data to the user's device. In exemplary arrangements the depository identifying data may include GPS coordinates, address data or other information that can be used to locate the depository.

As represented at step 150 the user's device is operative to receive the data from the central circuitry. The user may then operate their device in the manner represented in FIG. 6 to produce a data bearing record which includes data representative of the origin and destination address as well as indicia which uniquely identifies the deposit item. This is represented by a step 152. In the exemplary arrangements the identifying indicia may include a machine readable bar code or other suitable record data which can be read for purposes of identifying the deposit item. As represented in a step 154 in the exemplary arrangement the user may operate their device in association with a label printer to produce a label which is then applied to the deposit item. In the exemplary arrangement the label that is applied to the deposit item is externally visible such that it can be read through operation of the reading devices included in the depository. The label may also include human readable indicia so that the particular deposit item can be visually identified by transport users or other users who access the depository. Of course it should be understood that in other exemplary arrangements other types of indicia may be utilized for purposes of providing identifying indicia. Such indicia may include for example, programmable RFID tags, QR codes, a signature or other manually made indicia, or other indicia that may be placed in operative connection with a deposit item for purposes of enabling the identification of the item through operation of the system.

As represented in a step 156 the user seeking to have the deposit item transported may utilize their device to guide their travel to the GPS location or other location as identified to the device, so that the user may place the item into the depository. In the exemplary arrangement the user operates their device to cause data corresponding to a data bearing record which identifies the user, to the at least one input device on the depository. This is represented by a step 158. In the exemplary arrangement the user device is operative to send user identifying token data to the RF input device included in the depository. The depository receives the user identifying data as represented in step 160. The control circuitry of the depository is operative to enable the keypad of the exemplary embodiment to receive a manually input code therethrough from the user as represented at step 162. As represented at step 164 the control circuitry of the depository is operative to wirelessly transmit data corresponding to the received user identifying data and the one-time code as well as depository identifying data to the central circuitry. This may be done in a suitably encrypted manner or using other suitable security techniques to assure that the data is not compromised.

The central circuitry is operative to receive the data from the depository as represented at a step 166. The central circuitry then operates as represented at step 168 to verify that the received user identifying information corresponds to the authorized user, and that the one-time code corresponds to the code provided to the user in connection with the request to transport the deposit item. In the exemplary arrangement the central circuitry is operative to assign to the user a code that can be utilized only on one occasion for purposes of opening the depository. This prevents the authorized user from opening other depositories or the same depository on multiple occasions using the provided code.

Responsive to the central circuitry making a determination that the data received by the depository from the user is the appropriate data for the user accessing the depository in connection with receiving the deposit item, the central circuitry is operative to send one or more messages to the depository as represented in step 170. The messages include instructions or data which are operative to cause the control circuitry of the depository to unlock the lock which holds the depository door in the closed position. At a step 172 the control circuitry of the depository operates to verify that the received message data corresponds to an authorized message from the central circuitry to unlock the lock. This may be done by an analysis of the received message data including decryption of the instructions and other data included in the message which verifies the instructions as appropriately authorized by the central circuitry.

If the control circuitry of the depository determines that the message data from the central circuitry is genuine, the circuitry operates to cause the lock to be changed to the unlocked condition. This is represented at a step 174. The control circuitry then operates to detect the opening of the depository door and causes the plurality of reading devices to operate to capture images including the indicia included on the depository item as represented at step 176. The control circuitry also operates to capture images showing the user as well as the depository item as it is being placed into the interior area of the depository. These images are stored in the data store associated with the control circuitry of the depository along with time data to indicate when the activity occurred. This is represented by a step 178. Further in exemplary arrangements data from the at least one weight sensor may be captured to indicate the weight of the item. The additional weight added to the depository may be used to verify that the weight indicated for the item is accurate. If the item is heavier, the person requesting the shipment may be assessed an additional charge. Image capture devices such as cameras or LIDAR sensors may be used to capture data that is used to determine the size of the item. Image sensors, sonic sensors or other sensors may operate to capture other properties such as color, sound absorption, reflectivity of light or sound waves, or other types of signals as well as combinations thereof. Further the weight, size and/or other property (or a combination of properties) associated with the item may be used as an additional identifying feature and tracking identifier for the item. Of course these approaches are exemplary.

In the exemplary arrangement the control circuitry of the depository is operative to send data corresponding to the indicia read, detected and/or sensed from the deposit item to the central circuitry as represented at step 180. The central circuitry receives the data as represented at step 182 and verifies that the indicia corresponds to the identifying information associated with the deposit item and the authorized user who is authorized to place the deposit item in the depository. This is represented by step 184. The central circuitry is then operative to send one or more messages to the depository indicating that the deposit item is acceptable into the depository. This is represented by a step 186. It should be understood however that if the central circuitry determines that the indicia associated with the deposit item is incorrect and/or does not correspond with the authorized user who has accessed the depository, the central circuitry will send at least one message including data which is indicative of this discrepancy to the depository.

In the exemplary logic flow as represented at step 188 the depository receives the data indicative of whether the deposit item and its receipt into the depository is acceptable. The control circuitry of the depository then operates to provide an indication if the acceptance of the deposit item is authorized. This is represented by a step 190. In the exemplary arrangement, the control circuitry of the depository is operative to cause operation of the at least one indicator 32 to provide an indication as to whether the acceptance of the deposit item is authorized. For example in an exemplary arrangement the indicator may be operated to provide a green color light output when the deposit item is acceptable and a red color light output when the deposit item is not acceptable. In addition an audio annunciator output or other indicator output may be output by the depository to indicate the acceptability or unacceptability of the deposit.

Further in exemplary arrangements a determination as to the acceptability or unacceptability of the deposit item or the associated circumstances may also be sent to the portable device of the authorized user. Such information may be sent in the form of a text message or other suitable output to indicate to the user the acceptability or unacceptability of the deposit item or activity. Such approaches may be useful in some exemplary systems for purposes of preventing users from making mistakes in placing incorrect deposit items into depositories. Such features may be particularly helpful in situations where an authorized user may be handling multiple deposit items, some of which may be intended for placement in a particular depository while others are not. Of course these approaches are exemplary and in other embodiments other approaches may be used.

In the exemplary arrangement the control circuitry associated with the depository is operative in a step 192 to evaluate the image data captured by the reading devices and/or the weight sensors to make an action status determination. The action status determination includes evaluating the image data and/or weight data for purposes of determining whether the deposit item has been placed in or removed from the interior area of the depository. In this exemplary logic flow the determination of action status by the control circuitry is indicative that the deposit item has been placed in the depository. After the action status determination that the deposit item has been received, the control circuitry of the depository senses for the door of the depository being closed. This is done through appropriate switches, detectors or the reading devices in operative connection with the control circuitry and is represented in a step 194. In some exemplary arrangements the control circuitry will cause at least one output device of the depository to provide outputs which instruct the user to close the depository door in the event that such action is not taken within a calculated time of the deposit item being received. In other exemplary arrangements the user's portable wireless device may receive messages from the central circuitry that are caused to be sent responsive to messages from the depository in the event that the user is detected as not taking appropriate steps towards closure of the door after the deposit item has been deposited in the interior area.

Once the depository door is in the closed position, the control circuitry operates to cause the lock to be changed to the locked condition as represented in a step 196. The control circuitry of the depository then operates to send one or more messages to the central circuitry indicating that the deposit item has been received in the depository as indicated at step 198. Responsive to receiving the messages from the depository, the central circuitry is operative to update the record data stored in its associated data store to reflect the status of the deposit item as being within the particular depository as represented at step 200.

The central circuitry then operates to take the actions necessary to arrange for the deposit item to be transported from the depository into which it has been received, to a depository associated with the destination address for the item. In some circumstances the central circuitry is enabled to arrange for single authorized user of the system to transport the deposit item from the depository into which it is received to another depository which corresponds to the final destination address for the deposit item. However, in many situations the central circuitry must arrange for the transport of the deposit item to an intermediate location which corresponds to a depository which is only part way to the final destination. This occurs because the individuals available to transport the deposit item are available only to transport the item to the intermediate destination. The central circuitry will then later arrange for a different authorized user to transport the item from the intermediate destination to the depository at the final destination for the deposit item. Of course it should be understood while this example indicates that the deposit item is transported through a depository at one intermediate destination, other exemplary deposit item transport situations will involve transport through multiple intermediate destinations. This is particularly true when the transport of the deposit item is over a long distance. In some exemplary arrangements the incentive payments which the system user arranging for the transport can make, will help to reduce the number of intermediate depository destinations and result in delivery of the deposit item to the final destination more quickly.

As represented at step 202 an authorized system user that is willing to transport deposit items may operate their portable wireless device, such as device 92, to indicate their willingness to transport deposit items by initiating operation of an application on the device. In the exemplary arrangement the device application requires that the user sign onto the device and provide appropriate identifying information which identifies the particular user to the central circuitry, as represented at step 204. The user identifying information in the user device and the central circuitry will have been previously established through a registration process applicable to authorized users. In the exemplary arrangement the circuit executable instructions associated with the user's device 92 also require that the user provide location information such as through GPS data associated with the current device location. This is represented at step 206.

In the exemplary system a user may choose to transport deposit items based on planned travel for other purposes. This may include for example, the user having a daily commute to a job that is substantially remote from where they reside. Alternatively user may have planned travel for personal or other purposes to a destination, and is willing to transport deposit items in the course of their personal travel. Alternatively a user may be willing to perform transport services of deposit items to any local location to receive compensation for the transport services. As represented in step 208 the user inputs to the device their destination information related to their current travel plans, or if the user is willing to travel to any location within a set distance range for purposes of making deliveries of deposit items. In some arrangements the user may also indicate that they have specialized capabilities such as handling fragile or perishable items, handling large and/or heavy items, and/or may be bonded or insured for handling high value or legally controlled items. As represented at step 210 the control circuitry associated with the user's portable wireless device is operative to send the data regarding the available transport user to the central circuitry for purposes of determining if the user will receive transport job assignments which will result in compensation being paid to the user.

As represented at step 212 the central circuitry receives the data from the user device and conducts an analysis of the received data as represented at step 214. The central circuitry is also operative to recover the stored data regarding the rating information associated with the user as represented in step 216. The central circuitry is then operative to compare the data associated with the available transport user to the data associated with available transport jobs that need to be conducted this is represented at step 218. Of course as can be appreciated, this activity is carried out by the central circuitry for each authorized transport user that indicates availability to participate in providing transport services for deposit items at the current time. The central circuitry is enabled to match available authorized transport users with transport jobs in a manner that causes the deposit items to be moved to either a respective final delivery destination of the deposit item, or an intermediate delivery location at a depository that causes the deposit item to move closer to its final delivery destination.

As represented in step 220 the central circuitry operates to match the authorized transport user and the associated user destination data to depository and deposit item delivery requirements. The central circuitry is then operative to determine the endpoint destination for the authorized transport user as represented in step 222. In this particular example the endpoint for the initial transport user is an intermediate depository that is not the final destination for the particular deposit item. The central circuitry is then operative to calculate the rate information for the transport user as represented in step 224. In an exemplary arrangement this calculation reflects an amount that the transport user will receive for taking the deposit item from the current depository in which it is located, transporting it to the designated intermediate depository, and placing the deposit item in the intermediate depository for subsequent transport towards its final destination.

As represented in step 226 the central circuitry operates to send one or more messages to the portable wireless device of the transport user. The messages include the pickup, parcel, route, end point and rate to be paid to the user for transport of the deposit item. The exemplary messages may also indicate to the user how far the transport job will require the user to go off their planned route to the input destination. In operation of the exemplary system the user's device receives the data regarding the transport assignment as represented at a step 226. The control circuitry of the user device is then operative responsive to the received data to provide one or more outputs to the user indicative of the available transport assignment. The output data is then available for review by the user as represented at step 228. If the user finds the transport assignment details to be acceptable, the user operates the device to provide one or more inputs as represented at step 230 which indicates that the user accepts the transport assignment. The user device then operates in accordance with its programming to send one or more messages indicative of the user acceptance to the central circuitry as represented at step 232.

The central circuitry receives the message data from the user's device indicating acceptance of the transport assignment as represented at step 234. The central circuitry then operates to reserve the transport assignment for the authorized user as represented at a step 236. In the exemplary embodiment the central circuitry operates in accordance with its programming to reserve the transport assignment for the particular user only for a limited period of time. This helps to assure that the deposit item is transported in a commercially prompt manner. In the event that the authorized user to which the transport assignment has been reserved does not act to obtain the deposit item from the depository within the time period for which the transport assignment has been reserved, the central circuitry operates in accordance with its programming to reassign the transport assignment to a different designated authorized user. As can be appreciated such a reassignment would generally require analysis of available transport user information and may change the route or other information to which the deposit item is next transported. Of course these approaches are exemplary and in other embodiments other approaches to be used.

Also in an exemplary embodiment a transport user may accept a plurality of transport assignments associated with their planned or available travel. This may include a plurality of different deposit items, each of which has a respective different pickup depository and delivery depository. The communication between the user device and the central circuitry enables storing the data related to each deposit item and transport job on the user device to facilitate the activities that the user is to perform in a proper manner and sequence.

In the exemplary arrangement once the transport assignment has been reserved for the authorized transport user, the central circuitry operates in a step 238 to generate the one-time access code that will enable the authorized user to access the depository in which the deposit item is currently located. At step 240 the central circuitry then operates to send the one-time access code and location data for the depository to the authorized user. The user's device operates to receive the data as represented at step 242. The user device then operates in accordance with its programming to guide the user such as through the use of GPS data, to the depository location at which the deposit item is to be picked up.

Once the authorized transport user has arrived at the depository, the user device is operated by the user to wirelessly send their user identifying information to the at least one input device of the depository. In the exemplary arrangement as represented at step 244, the user's wireless token data is sent from the device of the user to the RF input device of the depository. The control circuitry of the depository is operative to receive user identifying data as represented at step 246, and is also operative to enable the keypad of the depository to receive the one-time code as represented at step 248. The control circuitry is then operative as represented at step 250 to send the data corresponding to the user identification data, the one-time code and depository identifying data to the central circuitry. The central circuitry operates to receive the data from the depository as represented at step 252 and to verify that the user identifying data corresponds to the authorized user who is to receive the deposit item, and that the one-time code is appropriate for accessing the depository. This is represented by step 254.

Responsive to the determination that the user identifying data and the one-time code received at the depository is appropriate for accessing the deposit item, the central circuitry then sends a message to the depository as represented at step 256 to enable the depository to be accessed. As represented step 258 the control circuitry of the depository is operative to receive and verify the genuineness of the message data from the central circuitry. Responsive to verification of the message, the control circuitry is operative to cause the lock to be changed to the unlocked condition as represented at step 260. The control circuitry associated with the depository is then operative to detect the opening of the door and to operate the reading devices to capture the indicia included on the deposit item that is removed from the interior area of the depository as represented by step 262. The exemplary control circuitry is also operative to capture a plurality of images including the user and the deposit item, and to store the image data along with time data in the data store associated with the depository control circuitry. The weight sensor is also operative to indicate the weight associated with the removed item. This is represented by step 264.

The control circuitry is then operative at step 266 to cause the identifying indicia read from the deposit item and the weight data to be sent to the central circuitry. The central circuitry receives the data at step 268 and is operative at step 270 to verify that the read indicia corresponds to the deposit item identifying data that is to be taken by the identified user that has accessed the depository. The central circuitry may also verify that the weight removed and/or the size and/or other property of the item removed corresponds to removal of the proper item. The central circuitry then operates at step 272 to send one or more messages to the depository, that indicate that the deposit item identification indicia and user indicia is appropriate. The control circuitry of the depository receives the message data from the central circuitry as represented at step 274 and is operative to provide an indication to the user that the removal activity is appropriate as represented at step 276. As previously discussed this indication may be given through visual and/or audible indications output by indicators on the depository. Of course if the deposit item removal activity or user data is not appropriate, then negative indication outputs are provided either through the depository indicators and/or through messages that are sent by the central circuitry to the user's portable wireless device.

The control circuitry of the depository is then operative responsive to the captured image data from the reading devices, and/or the detected change in weight to make a determination of the action status that has been carried out by the user with regard to the identified deposit item. This determination which is represented by step 278, is an action determination that the deposit item has been removed from the interior area of the depository. The control circuitry associated with the depository then senses for detection that the depository door has been closed as represented in step 280. As previously discussed the depository either alone or through communication with the central circuitry, may operate to prompt the user to close the depository door in the event that closure is not detected within a programmed time. The control circuitry then operates to cause the lock to be changed to the locked condition once the door is closed as represented by step 282. The control circuitry then operates to send one or more messages to the central circuitry indicating that the deposit item has been removed from the depository as represented by step 284.

Responsive to the central circuitry receiving the one or more messages from the depository that the deposit item has been taken, the exemplary central circuitry operates as indicated at step 286 to update the status data for the deposit item in the associated data store to indicate that the deposit item is with the authorized user. In the exemplary arrangement the central circuitry then operates to cause a message to be sent to the portable wireless device of the user who has taken the deposit item to confirm that they have the item. This is represented by step 288. The portable wireless device of the user operates in accordance with its programming to cause one or more outputs that prompt the user to confirm that they have received the deposit item. This is represented at step 290. As represented at step 292, the user's portable wireless device operates responsive to at least one confirmation input from the user to send one or more wireless messages to the central circuitry to confirm that the user received the deposit item.

Responsive to the central circuitry receiving the confirmation data from the user's portable wireless device at step 294, the central circuitry operates to recover from memory the destination for the transport user to deliver the deposit item. This is represented at step 296. The exemplary central circuitry further operates to generate a one-time access code to be input by the user to the depository into which the user is to place the deposit item. This is represented by step 298. The exemplary central circuitry is next operative to send the one-time code and the location information for the destination depository to the user's portable wireless device. This is represented by step 300. The exemplary central circuitry continues to monitor the location of the portable wireless device of the transport user through GPS as the deposit item is transported toward the destination depository. This is represented by step 302.

As represented by step 304, in the exemplary system the portable wireless device of the transport user is operative to receive the data regarding the depository location and the one-time code. The portable wireless device operates in accordance with its programming to direct the user through use of the GPS data or other location data to the destination depository at which the deposit item is to be deposited. This is represented by step 306. Upon arrival at the destination depository the transport user operates their portable wireless device to cause the user identifying data to be sent from the user's device to the RF input device of the depository. This is represented by step 308.

The control circuitry associated with the depository is operative to receive the wireless user identifying information as represented by step 310. The control circuitry is also operative to enable receipt through the keypad of the depository of the one-time code from the transport user. This is represented by step 312. The control circuitry associated with the depository is operative to send the received user identifying data, the one-time code, and depository identifying data to the central circuitry as represented by step 314. The exemplary central circuitry is operative to receive the data as represented by step 316 and to verify that the received user data and the one-time code are appropriate as represented in step 318. The exemplary central circuitry is then operative to send at least one message to the depository which includes data indicative that the received user data and the code data are appropriate, and that the depository should be opened. This is represented by step 320.

The control circuitry of the exemplary depository is operative to receive the message data from the central circuitry as represented by step 322. Responsive to the message from the central circuitry being verified, the control circuitry associated with the depository is operative to cause the lock to be changed to the unlocked condition as represented in step 324. Responsive to detecting that the depository door has been opened, the exemplary control circuitry is operative to cause the reading devices to capture the indicia including the identifying indicia on the deposit item being placed in the depository as represented by step 326. The control circuitry is also operative to cause images from the reading devices and the change in weight detected by the at least one weight sensor to be captured and stored in the at least one data store along with the data, to document the accessing of the depository and the placement of the deposit item therein. This is represented by step 328.

The exemplary control circuitry associated with the depository is next operative to send the indicia read and/or sensed from the deposit item to the central circuitry as represented in step 330. The central circuitry receives the data at step 332 and verifies that the indicia read and/or sensed from the deposit item (size, weight or other information or properties) corresponds to the deposit item to be deposited in the depository. The central circuitry also verifies that the identifying data associated with the user corresponds to the user that is authorized to place the item into the depository. This is represented by step 334. The central circuitry is then operative to send one or more messages to the control circuitry of the depository to indicate that the received identifying indicia on the deposit item is correct. This is represented by step 336. The exemplary control circuitry of the depository receives the data from the central circuitry as represented in step 338 and provides one or more outputs to the user to indicate that the indicia read and/or sensed from the deposit item is appropriate as represented in step 340. The exemplary control circuitry associated with the depository is then operative to analyze the captured image data and/or weight data to determine the action status associated with the deposit item. As represented in step 342 the control circuitry is operative to determine an action status that the deposit item has been received into the interior area of the depository.

The control circuitry then operates in accordance with its programming to sense for closure of the depository door. This is represented by step 344. As previously discussed the exemplary control circuitry may provide different forms of prompts to the user in the event that the depository door is not sensed as closed within a programmed time. Responsive to detecting the closure of the depository door the control circuitry operates to change the condition of the lock to the locked condition as represented by step 346. The exemplary control circuitry is then operative to send one or more messages from the depository to the central circuitry to indicate that the deposit item is within the depository as represented by step 348. The exemplary central circuitry responsive to receiving the messages, operates to update the status related to the deposit item in its associated data store to indicate that the deposit item is located within the particular depository. This is represented by step 350.

The exemplary central circuitry is next operative to send one or more messages to the portable wireless device of the transport user requesting confirmation that the deposit item has been placed in the depository. This is represented by step 352. The portable wireless device of the user operates responsive to the received messages to provide outputs which prompt the user to confirm the placement of the deposit item in the depository. This is represented by step 354. Responsive to receipt of at least one input from the user the portable wireless device is operative at step 356 to provide one or more messages to the central circuitry confirming that the user has placed the deposit item in the interior area of the depository.

The central circuitry of the exemplary embodiment is operative responsive to receipt of the data from the transport user at step 358 to determine that the transport user has completed the transport assignment and to calculate a payment that is due to the user as represented at step 360. The exemplary central circuitry is then operative to credit the user for the payment that is due as represented at step 362. This may include crediting an account associated with the transport user for the amount payable. Alternatively it may include a financial transfer to an account associated with the user. Various payment forms may be accomplished depending on the arrangement that has been set up by the central circuitry for making payment to the particular transport user. The exemplary central circuitry then operates to send one or more messages to the device of the transport user indicating the payment as represented at step 364. The transport user receives the notice of the payment through the portable wireless device which outputs appropriate messages to the user as represented at step 366. Of course it should be understood that these steps are representative of only some exemplary payment transactions that may be carried out responsive to operation of the central circuitry.

In this example the initial transport user was available only to transport the deposit item to a depository at an intermediate destination, and not to the final destination for the deposit item. Therefore responsive to the determination that the deposit item has arrived at the intermediate destination, the exemplary central circuitry is operative to determine a next destination for the deposit item. This is represented by step 368. As previously discussed the central circuitry will try to have the deposit item reach its final destination with a minimum number of intermediate destinations. However if it is not possible with the available transport users to move the deposit item to its final destination with the next transport assignment, the exemplary control circuitry will cause the deposit item to be moved to another intermediate destination that is closer to its final destination. However for purposes of this example the next transport assignment will result in the deposit item reaching its final destination.

The exemplary central circuitry conducts a similar analysis to that previously discussed with regard to available transport users for purposes of determining the next transport assignment which can be made for the deposit item. The central circuitry conducts an analysis of the available transport user information at step 370. The central circuitry also reviews the rating data and other information for the available transport users as represented at step 372. As represented at step 374 a comparative analysis is done of the available transport user data to pending transport jobs to produce a match as represented at step 376. The exemplary central circuitry will then operate to determine the destination endpoint for the deposit item delivery to be made by the available transport user as represented at step 378. In this example the next destination will be the depository which is the final delivery destination for the deposit item.

The exemplary central circuitry is further operative to calculate the rate information to be paid for the transport by the available transport user. This is represented at step 380. In some exemplary arrangements the central circuitry may operate to provide transport users with incentives to transport particular items. For example, if an item is not moving toward the final destination at an acceptable rate, the central circuitry may offer a premium to an available transport user to handle the item. Of course this approach is exemplary.

The exemplary central circuitry is then operative at step 382 to send one or more messages to the portable wireless device of the selected transport user which describes the transport job that is available. In the exemplary arrangement the data sent includes information regarding the pickup, parcel, transport route, endpoint and rate to be paid to the available transport user. Of course in some cases additional or different information may be provided. The portable wireless device of the transport user receives the data as represented by step 384. The portable wireless device of the transport user operates responsive to the received data to provide an output which indicates the details of the available transport job which the user can then review as represented at step 386. If the transport user wishes to accept the transport job, the user provides one or more inputs to their portable wireless device as represented at step 388, and the portable wireless device operates to send one or more messages indicating acceptance of the transport job as represented at step 390.

As represented by step 392 the central circuitry operates to receive the data indicating that the transport user has agreed to perform the transport job, and reserves the transport assignment for the user as represented at step 394. The central circuitry operates to generate one-time access code for the user as represented at step 396. The central circuitry operates to send the one-time access code and the vault location data to the user's portable wireless device as represented by step 398.

The portable wireless device of the user receives the access code and location information as represented by step 400. The portable wireless device operates in accordance with its programming and the vault location information to guide the user to the depository as represented by step 402. Once arriving at the depository the user operates the portable wireless device to send the wireless identifying information that identifies the user to the RF input device of the depository as represented by step 404. The depository receives the user identifying information as represented at step 406. The depository also receives the one-time code from the user as represented by step 408. The depository control circuitry is then operative to send at least one message including the user identifying information, the one-time code and the depository identifying information to the central circuitry as represented by step 410.

The central circuitry receives the data from the depository at step 412 and operates to verify the user identifying information and the one-time code as represented at step 414. The central circuitry is operative to send one or more messages to the depository indicating that the received user identifying information and code is appropriate for accessing the interior of the depository. This is represented by step 416. The control circuitry of the depository receives the message from the central circuitry indicating that the depository is to be opened and verifies the authenticity of the message as represented at step 418. The control circuitry associated with the depository is operative to cause the lock to be changed to the unlocked condition as represented at step 420. The control circuitry is further operative to capture the deposit item identifying indicia on the deposit item, image and/or size or other property data and the change in detected weight as the item is removed from the interior area of the depository as represented by step 422. The control circuitry also captures and stores images associated with accessing the depository including the user and the removal of the deposit item as represented by step 424. The control circuitry also associates time data with the captured images. The control circuitry is then operative to send data corresponding to the deposit identifying indicia, size, other property data and/or weight information to the central circuitry as represented by step 426.

The central circuitry is operative to receive the data as represented by step 428 and verify that the indicia read from the deposit item, size property data and/or weight data corresponds to the deposit item to be taken by the user whose identifying data has been received as represented at step 430. The central circuitry is then operative to send one or more messages to the depository indicating that the information received related to the deposit item and the user is correct. This is represented by step 432.

The depository is operative to receive the data from the central circuitry as represented by step 434 and to provide an indication to the user that the identifying indicia for the deposit item being removed is correct as represented at step 436. Of course as previously discussed, if the indicia, size, property and/or weight associated with the deposit item and/or the user data is incorrect, a warning indication is output from the depository and/or the user's portable wireless device to indicate the error. The control circuitry associated with the exemplary depository is then operative to determine from the reading devices the action status associated with the deposit item. In this case the action status corresponds to the deposit item being removed as indicated at step 438. The exemplary control circuitry of the depository then operates to sense the closure of the depository door as represented by step 440 and to change the condition of the lock to the locked condition as represented at step 442. The depository control circuitry is then operative to send one or more messages to the central circuitry to give a notification that the deposit item has been taken as represented by step 444.

The exemplary central circuitry is then operative to update data in at least one data store to update the status of the deposit item to indicate that the deposit is with the transport user as represented by step 446. The central circuitry also causes one or more messages to be sent to the transport user's portable wireless device requesting confirmation that the user has possession of the deposit item. This is represented by step 448. The portable wireless device of the transport user operates to receive these messages and to provide outputs to the user indicating the request for confirmation. This is represented by step 450. Responsive to the transport user providing inputs which confirm the user has the deposit item, the portable wireless device sends one or more messages to the central circuitry confirming possession of the deposit item by the user. This is represented by step 452.

Responsive to the central circuitry receiving the confirmation message from the user's portable wireless device at step 454, the central circuitry is operative to recover data corresponding to the destination for the deposit item at step 456 and to generate the one-time access code usable by the transport user to access the depository at the destination as represented at step 458. The central circuitry is then operative to send the one-time code and the location of the destination depository to the user at step 460.

The portable wireless device of the user receives the data including the one-time code and the depository location at step 462. The user operates the portable wireless device to be guided to the depository through GPS or other location finding methods as represented by step 464. The central circuitry of the exemplary arrangement tracks the transport user through GPS tracking as represented by step 466. Upon arrival at the destination depository the transport user operates their portable wireless device to provide their user identification data to the RF input device of the depository as represented at step 468. The control circuitry is operative to receive the user identifying data as represented at step 470. The keypad of the depository is also operative to receive the one-time code from the user as represented at step 472. The control circuitry of the depository is operative to send the user identifying data, the one-time code and depository identifying data to the central circuitry as represented at step 474.

The central circuitry receives the data from the depository as represented at step 476 and operates to verify the user identifying data and the one-time code as authorized at step 478. The central circuitry is operative to send one or more messages to the depository indicating that the received data is appropriate as represented by step 480, and the control circuitry of the depository is operative to verify the received message data at step 482. Responsive to the received message data indicating that the user data and the code data is authorized, the control circuitry of the depository is operative to cause the lock to be changed to the unlocked condition as represented by step 484. The control circuitry operates the reading devices to capture the indicia on the deposit item, size, property and/or weight data for the item that is being placed in the interior area of the depository as represented by step 486. The control circuitry also operates the reading devices to capture images including the user access to the depository and the placement of the deposit item therein, and to store the image data along with associated time data in the data store of the control circuitry. This is represented by step 488.

The control circuitry of the depository is operative to send the indicia read and/or sensed from the deposit item to the central circuitry as represented by step 490. The central circuitry receives the identifying indicia at step 492 and is operative in a step 494 to verify that the identifying indicia, size, property and/or weight information corresponds to the appropriate deposit item and that the user identifying data corresponds to the appropriate user. The central circuitry is operative to send one or more messages verifying the correctness of the input data as represented at step 496. The control circuitry of the depository receives the data as represented by step 498 and provides one or more outputs through the indicators of the depository that the deposit information is correct as represented by step 500.

The control circuitry associated with the depository is operative to determine the action status of the deposit item from the data captured by the reading devices. As represented in step 502 the action status determination indicates that the deposit item has been received into the depository. The control circuitry operates to sense the closing of the depository door in a step 504, and responsive to sensing the door closure changes the lock to the locked condition as represented by step 506. The control circuitry of the depository then operates to send one or more messages to the central circuitry to indicate that the deposit item is located within the depository. This is represented by step 508. Responsive to receiving the messages indicating that the deposit item is within the depository the central circuitry is operative to update the stored record data regarding the deposit item in the data store to indicate that the deposit item is within the particular depository as represented by step 510.

The exemplary central circuitry then operates to cause one or more messages to be sent to the portable wireless device of the transport user requesting confirmation that the deposit item has been placed in the depository. This is represented by step 512. The portable wireless device of the user receives the messages and provides outputs to the user indicating the request for confirmation. This is represented by step 514. Responsive to inputs by the user to their portable wireless device confirming the placement of the deposit item in the depository, the portable wireless device is operative to send one or more confirmatory messages as represented at step 516.

Responsive to the central circuitry receiving the confirmatory message that the deposit item has been placed in the depository at step 518, the central circuitry is operative to calculate the payment that is due the user for transport of the depository item. This is represented by step 520. The central circuitry is then operative to credit the transport user for the transport services provided as represented at step 522. One or more messages are sent to the transport user at step 524 which are received by the user's portable wireless device and which provide outputs to the user indicating the payment made for the transport of the deposit item as represented at step 526.

Responsive to the determination by the central circuitry that the deposit item has been delivered to the indicated final destination, the central circuitry is then operative to determine the deposit item recipient to be notified of the delivery. This is represented by step 528. In exemplary arrangements the recipient of the deposit item may be the owner of the depository into which the deposit item has been placed as the final destination. Alternatively the recipient to be notified may be a user of the system that is not the owner of the depository in which the item has been placed, which necessitates notification and providing access for the intended recipient.

Figure 28:
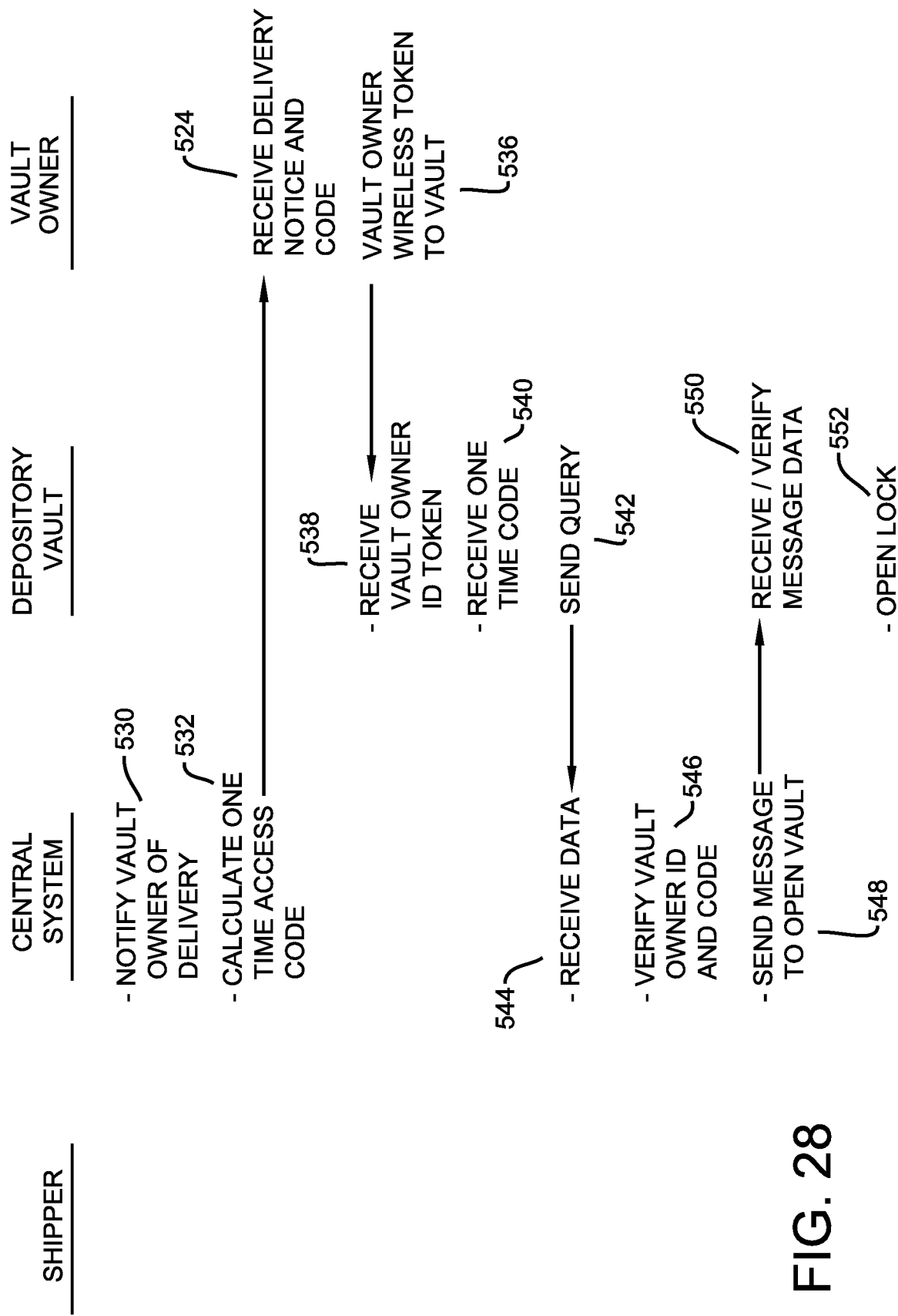
Figure 29:
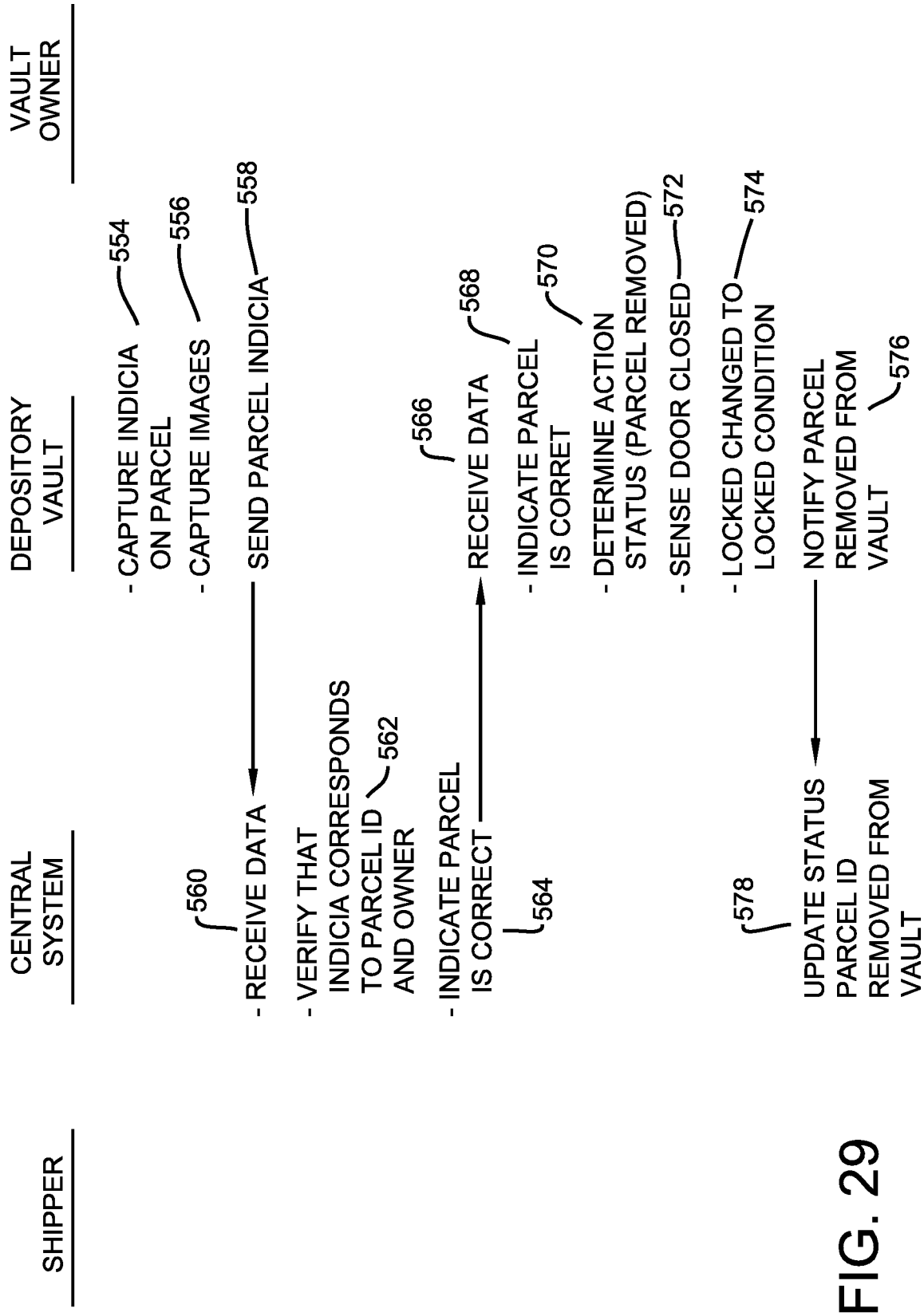
Figure 30:
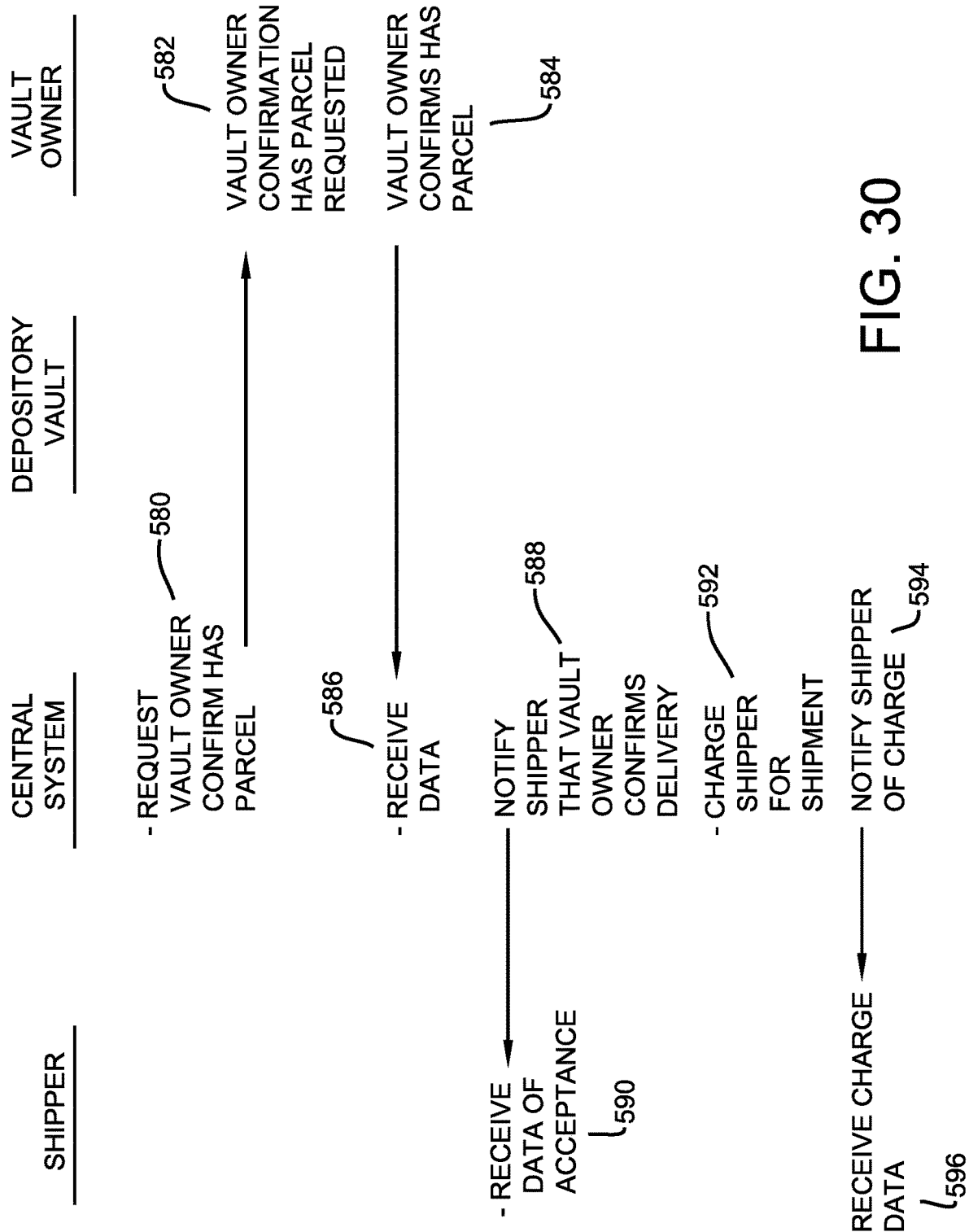
Figure 31:
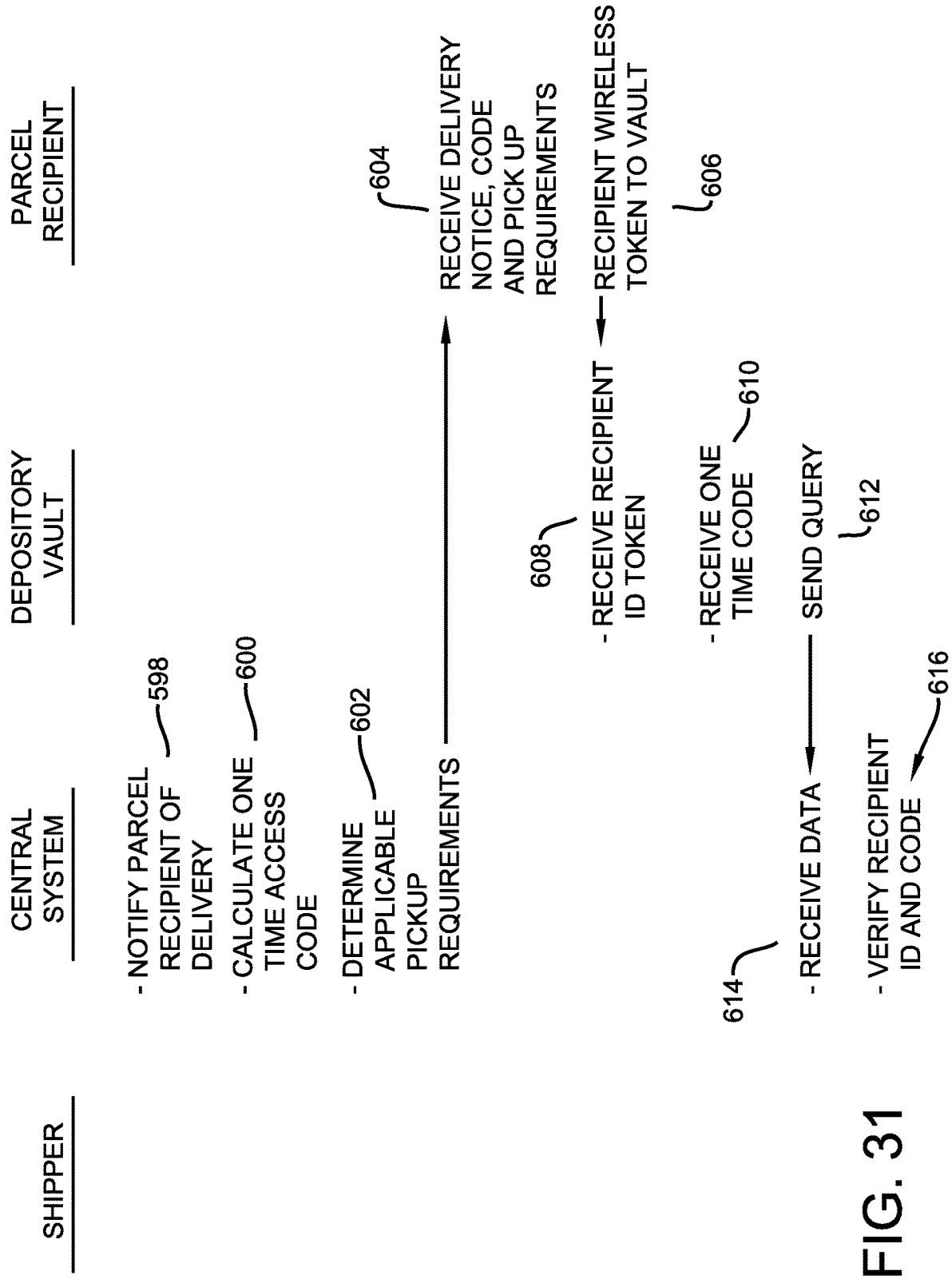
FIGS. 31 through 34 are a schematic representation of logic flow carried out by the control circuitry of the exemplary depository, associated central system circuitry and devices operated by authorized users in connection with delivery and payment associated with a deposit item placed in the depository.
Figure 32:
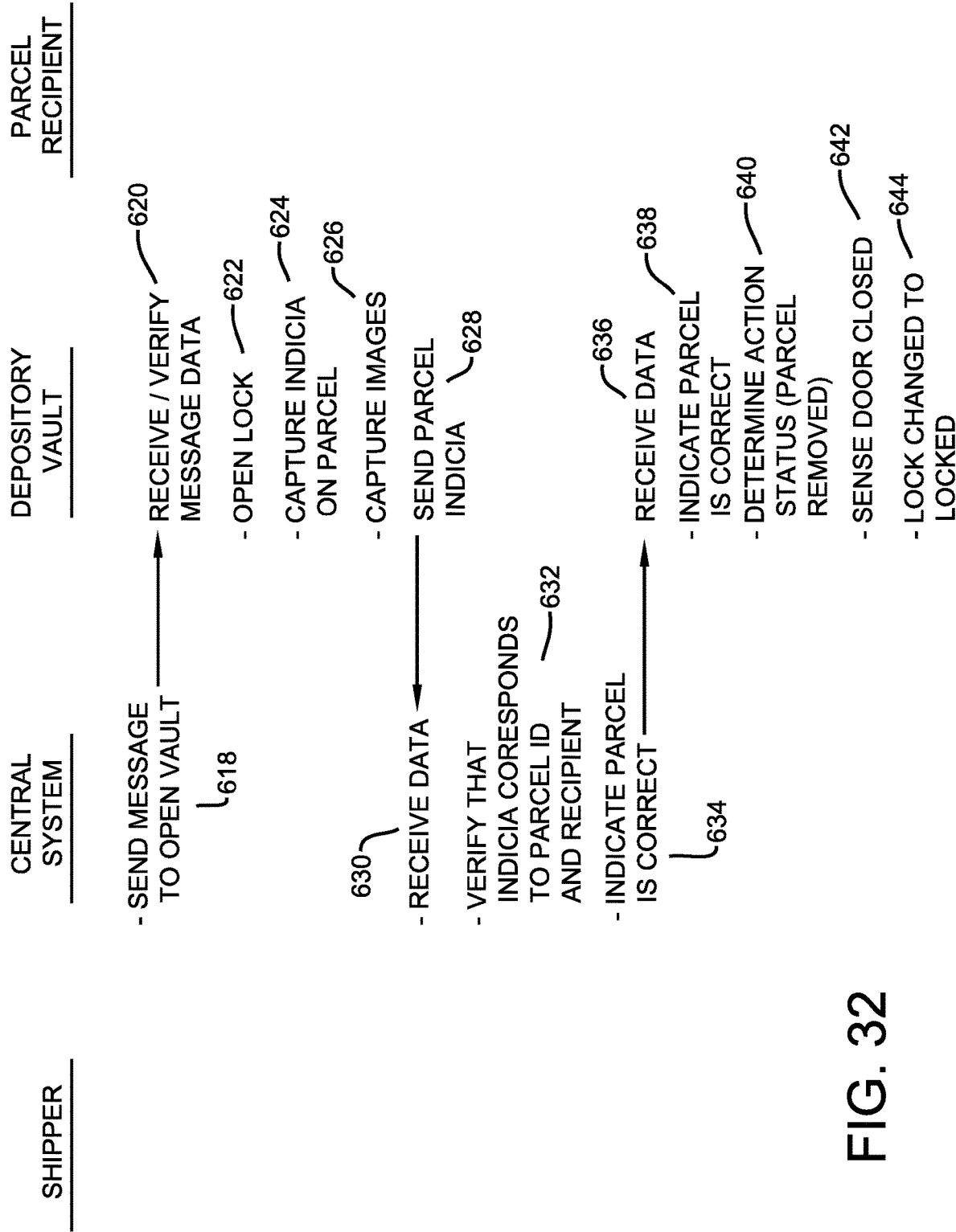
Figure 33:
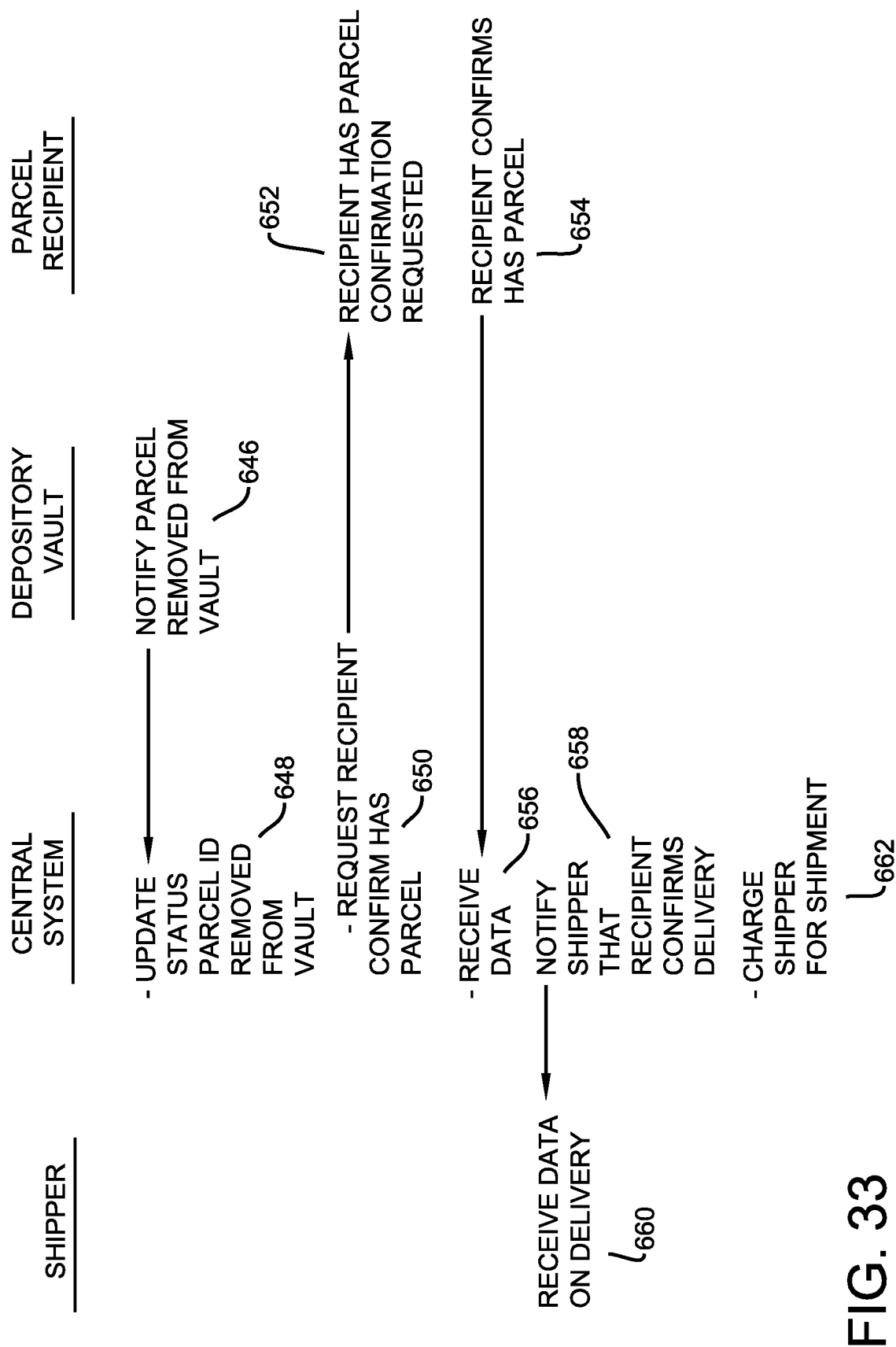
Figure 34:
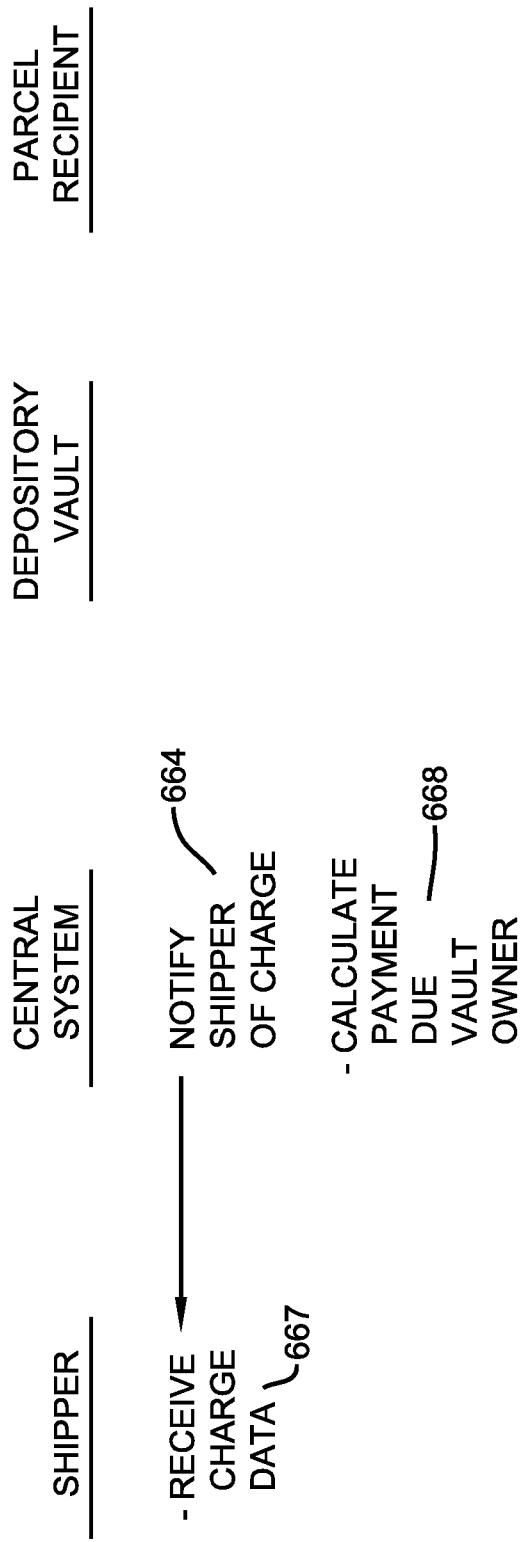

An example where the recipient of the deposit item is the owner of the depository is represented by the logic flow included in FIGS. 28 through 30. Responsive to the central circuitry determining that the depository owner is the recipient of the deposit item to be notified in step 528, the central circuitry operates to produce a notification to the depository owner at step 530 and calculate a one-time access code for accessing the depository to retrieve the deposit item at step 532. The central circuitry then operates to send the notification and the one-time code to the portable wireless device of the depository owner as represented at step 534. The depository owner then travels to the depository and inputs their wireless identifying data to the RF input device of the depository as represented by step 536. The control circuitry of the depository receives the wireless identifying data at step 538 and also operates to receive the one-time code through the keypad at step 540. The control circuitry of the depository is then operative to send data corresponding to the identification data, the code and the depository to the central circuitry at step 542.

The central circuitry operates to receive the data at step 544 and to verify at step 546 that the received user identifying data and code data correspond to the data for authorized access to the deposit item. The central circuitry then operates to send one or more messages to the depository as indicated at step 548. The control circuitry of the depository receives and verifies the message data at step 550 and changes the condition of the lock on the depository to the unlocked condition as represented by step 552. The control circuitry of the depository operates to capture the deposit identifying indicia on the deposit item, size, property and/or weight data associated with the item being removed from the depository as represented by step 554 and also captures images of the depository user and the deposit item which are stored in the data store of the depository control circuitry along with time data as represented at step 556.

The control circuitry associated with the depository is operative to send the deposit item identifying indicia, size, property and/or weight data to the central circuitry as represented at step 558. The central circuitry receives the data at step 560 and at step 562 verifies that the indicia a, size, property and/or weight data sent from the deposit item and the user identifying data, corresponds to the authorized removal of the deposit item from the depository. The central circuitry is operative at step 564 to send one or more messages to the depository indicating that the received information is appropriate. The control circuitry of the depository receives one or more messages at step 566 and provides an indication through the one or more indicators of the depository that the deposit item removal data is appropriate at step 568.

The exemplary control circuitry associated with the depository is then operative to determine from the captured image data, size, property and/or weight data the action status of the deposit item. This is done in a step 570 in which the action status that the deposit item has been removed from the depository is determined. The control circuitry then operates to sense the closing of the depository door in step 572 and causes the condition of the lock to be changed to the locked condition in a step 574. The control circuitry of the depository then operates to send one or more messages to the central circuitry to indicate that the deposit item has been removed from the depository at step 576.

The exemplary central circuitry then operates to update the status data included in one or more data stores of the central circuitry to indicate the deposit item has been removed from the depository as represented in step 578. The central circuitry operates to send one or more messages to the portable wireless device of the depository owner to confirm that they have taken the deposit item as represented by step 580. The portable wireless device of the depository owner receives the messages and provide outputs indicating that the confirmation is requested. This is represented by a step 582. Responsive to the depository owner providing one or more inputs to their portable wireless device confirming receipt of the deposit item, the portable wireless device operates to send one or more messages to the central circuitry as represented by step 584.

The central circuitry receives the confirmation from the depository owner at step 586. Responsive to receiving the confirmation that the deposit item has been received by the intended recipient, the central circuitry operates to send one or more messages to the shipper user who is responsible for causing transport of the deposit item to the recipient. This is represented by step 588. Receipt of the information by the originator of the deposit item is represented by step 590. The exemplary central circuitry is also operative at step 592 to calculate the charge associated with the transport of the deposit item and to assess the charge to the entity that requested the transport. The entity requesting the transport is notified of the charge through one or more messages which are sent at step 594 and which are received by the user through their portable wireless device at step 596. In the exemplary arrangement the charges are assessed in the manner as designated by the user requesting transport at the time that the request was input to the system. Of course these approaches are exemplary and in other embodiments other approaches may be used.

The exemplary logic flow when the recipient of the deposit item is not the owner of the depository is represented in FIGS. 31 to 34. In this exemplary arrangement from step 528 the central circuitry is operative to determine the deposit item recipient to be notified as represented in step 598. The central circuitry is further operative to determine the one-time access code to be used to access the depository at step 600. The central circuitry is also operative to determine the applicable requirements associated with the depository as represented at step 602. This may include restrictions placed on operation of the depository by the depository owner, such as times for access or other requirements which restrict use of the depository by entities other than the depository owner.

The exemplary central circuitry is operative to send the notification and code and other applicable requirements to the portable wireless device of the recipient as represented by step 604. The portable wireless device is operative to provide outputs to the recipient of the information needed to access the depository to retrieve the deposit item. As can be appreciated, the information sent to the recipient may include GPS or other location data that facilitates the recipient traveling to the depository to obtain the deposit item.

The recipient upon being in proximity with the depository operates their portable wireless device to provide the wireless user identifying data to the RF input device of the depository as represented by step 606. The depository receives the identifying data as represented by step 608 and also receives the one-time code through the keypad as represented by step 610. The control circuitry is operative to cause the received user identifying data, the code data and depository identifying data to be sent to the central circuitry as represented by step 612. The central circuitry receives the data as represented at step 614 and operates to verify the received user identifying data and the code data as represented at step 616. The central circuitry is then operative in a manner like that previously discussed to send one or more messages to the depository indicating that the activity is authorized and that the depository should be unlocked. This is represented by step 618.

The control circuitry associated with the depository is operative to receive and verify the messages from the central circuitry as represented by step 620. Responsive to the messages the control circuitry is operative to unlock the lock as represented by step 622 and to cause the reading devices to capture the size, properties and/or weight associated with the item and the indicia on the deposit item removed from the depository as represented by step 624. The control circuitry is also operative to capture images of the user and the deposit item, and store the images and size, property and/or weight data in the data store associated with the control circuitry along with time data as represented by step 626.

The control circuitry associated with the depository is operative to send the indicia read and/or sensed from the deposit item such as size, property and/or weight data to the central circuitry as represented by step 628. The central circuitry receives the data as represented by step 630 and operates to verify that the received indicia and weight data corresponds to the appropriate depository item and the user identifying data for the recipient as represented by step 632. The central circuitry is operative to send one or more messages to the depository indicating that the information related to removal of the deposit item is correct. This is represented by step 634. The control circuitry of the depository is operative to receive the messages from the central circuitry as represented by step 636 and to provide one or more outputs through the indicators on the depository that the deposit item information is correct as represented by step 638.

The control circuitry of the depository is then operative to analyze the captured image data, size property and/or weight data to determine the action status associated with the deposit item as represented by step 640. In this situation the control circuitry is operative to determine that the deposit item has been removed from the depository. The control circuitry is also operative to sense for closure of the depository door as represented by step 642, and responsive to sensing the closure thereof, to cause the lock to be returned to the locked condition as represented by step 644. The control circuitry of the depository is operative to send one or more messages to the central circuitry indicating that the deposit item has been removed from the depository as represented by step 646. The central circuitry is operative to receive the messages from the depository and update the status data in the data store related to the deposit item to indicate that the deposit item has been removed from the depository as represented in step 648.

In a manner like that previously discussed, the central circuitry is further operative to cause one or more messages to be sent to the portable wireless device of the recipient. This is represented by step 650. The messages request confirmation that the deposit item has been received by the recipient. The portable wireless device of the recipient is operative responsive to the messages to provide outputs requesting such confirmation as represented by step 652. The recipient then provides one or more inputs to their portable wireless device confirming receipt of the deposit item as represented by step 654. The central circuitry is operative to receive the confirmation from the recipient at step 656, and to send a notification message to the shipping user that requested the transport of the deposit item to indicate that the item has been received at step 658. The portable wireless device of the user that requested the transport receives one or more delivery indication messages as represented by step 660.

The central circuitry is also operative to calculate the charge to be assessed to the user requesting transport of the deposit item for the transport thereof. This is represented by step 662. The charge for transport is assessed to the user in the manner designated at the time of requesting shipment, and the user is notified of the charge as represented at step 664. The user receives the charge notifications through their portable wireless device as represented by step 667.

Further in this exemplary arrangement because the deposit item was delivered to the recipient through the depository that is owned by a depository owner other than the recipient, the depository owner receives a payment for the use of their depository. In the exemplary arrangement the central circuitry is operative to calculate the payment due the depository owner as represented in a step 668. In some exemplary arrangements the central circuitry is operative to send one or more messages to the portable wireless device or other system operated by the depository owner to indicate the receipt of the payments for the use of the depository. Alternatively in other exemplary arrangements, the central circuitry may operate to credit the account of the depository owner for such use of the depository by offsetting the amount of credits against charges to the depository owner for transport of depository items. Of course it should be understood that these approaches are exemplary and in other embodiments other approaches may be used.

It should be understood that while the examples provided discuss users dealing with a single depository item, in exemplary systems numerous different depository items will be handled by each authorized user. This may be particularly true of transport users that simultaneously handle a plurality of deposit items that are being transported between different depositories. The exemplary embodiments help to assure that the proper depository items are removed and deposited in the proper depository for purposes of transporting the item to the proper destination. The ability of the exemplary arrangements to provide an indication of any incorrect actions and to track the whereabouts of deposit items within the system at all times facilitates the prompt and reliable transport and delivery of such depository items.

Further the exemplary arrangements provide advantages for transport of items between depositories by enabling the transport to be made by individuals who often are otherwise commuting or otherwise traveling to locations where item transport can be conducted as an ancillary activity that generates revenue for the users. Such transport can also be made in incremental steps as previously discussed based on the available transport users. The ability to utilize such user resources can also provide more options for transport of items, while reducing costs compared to scheduled transport systems.

In exemplary arrangements the central system or other connected systems may be further operative to assure that the depositories operate properly and that malfunctions or anomalies are detected and corrected promptly. For example in exemplary arrangements the central system may operate to receive information from the control circuitry of each depository that is indicative of conditions or statuses associated with the devices that are included as part of the depository or that are in operative connection therewith. In some exemplary arrangements the control circuitry of each depository may be operative to automatically report condition and/or status information on a periodic basis to the central circuitry. Alternatively or in addition the central circuitry may be operative to periodically poll the control circuitry of each depository, which polling messages are operative to cause sending of information by the depository, and the receipt of the condition or status information by the central circuitry. Various combinations of such techniques and alternative arrangements for obtaining condition and status information associated with depositories may be provided in exemplary arrangements.

The control circuitry of depositories in some exemplary arrangements may be operative in accordance with circuit executable instructions to monitor signals associated with the devices included in or connected to the depository. This may include sensors which are operative to detect errors or malfunctions. For example, the control circuitry may operate to detect situations where cameras or other image capture devices associated with the depository are no longer operative to send image signals or have degraded clarity so as to indicate a loss of image capture capability. Other signals may be operative to detect a malfunction of sensors, such as switches that are operative to determine the status of the depository door or other component monitored by the switch. In other exemplary arrangements conditions associated with the lock or locks associated with the depository door may be monitored for purposes of detecting a malfunction or possible efforts at tampering. In some exemplary arrangements the circuitry may operate to monitor the operation of the one or more sensors, such as property sensors of the types previously discussed. Property sensors such as weight sensors, size sensors, image sensors, and other sensor types are monitored to determine if a sensor has malfunctioned or has decreased sensitivity. Other sensors may operate to detect abnormal conditions sent as high or low temperatures which may indicate a problem or a malfunction. Other sensors may operate to detect smoke or other particulate matter which may indicate combustion or other possible problems. Additional sensors may be operative to detect the temperature of the control circuitry, a power supply and/or a battery or other element in connection therewith, for purposes of determining a possible malfunction.

In other exemplary arrangements conditions associated with sensors or devices may be monitored to determine malfunctions or other conditions indicative of problems or a probable future problem. For example, if the depository is located in an environment that needs to be illuminated such as during evening hours, sensors may be operative to monitor for the presence of a level of ambient lighting that operates to illuminate the area of the depository for security reasons. The absence of a sufficient level of ambient illumination may be detected as an unacceptable condition which needs to be remedied by the replacement of bulbs or other illumination devices in the area of the depository. Further in exemplary arrangements the circuitry may be in operative connection with sensors that are operative to detect the power draw associated with the operation of depository devices. For example the control circuitry may be operative to detect the power draw associated with the electrical actuation needed for locking or unlocking the lock of the depository. The values associated with the power required for such activity may be stored and monitored over time. Alternatively or in addition, conditions associated with the available power capabilities provided by a battery and/or solar cells may be monitored to identify circumstances or trends which indicate that the battery and/or solar power source has failed or is exhibiting conditions which correspond to probable upcoming failure. In some exemplary arrangements such data may be stored and monitored over time. Such data may be analyzed to determine trends which are indicative of the particular component nearing an end-of-life condition or a probable future malfunction.

In other exemplary arrangements the control circuitry may operate to monitor connectivity associated with wireless communications for purposes of verifying that the depository is maintaining the required communications capability with the central system. The inability to maintain such communications capability over a period of time may indicate problems associated with the control circuitry and/or the network in which the depository is connected. Further in exemplary arrangements the depository may include sensors which may sense conditions that are indicative of a criminal attack on the depository. These may include for example conductivity integrity sensors which are positioned in the walls, bottom and/or door of the depository and which are operative to detect holes, cutting action or other attempts to access the depository interior. In other exemplary arrangements seismic sensors may be included in depositories for purposes of detecting circumstances under which a depository may be moved or may be subject to impacts for purposes of attempting to steal or breach the depository. Still in other exemplary arrangements sensors may be provided in or adjacent to the depository for purposes of determining external conditions such as fire, smoke, heat, flood or other conditions which are problematic to the operation of the depository unit. Of course these conditions which may be monitored and analyzed are exemplary, and in other embodiments other conditions may be detected and approaches may be used.

In exemplary arrangements the control circuitry associated with the depository may operate to analyze signals or conditions, and send messages to notify the central system circuitry of the particular condition. In some exemplary arrangements the depository control circuitry may be configured to operate so that detection of the condition may be automatically notified to the central system circuitry as soon as it is detected. This may include categories of urgent conditions such as circumstances which correspond to criminal attacks that attempt to access the interior of the depository. In other circumstances data corresponding to other less urgent conditions may be stored as status data in one or more data stores associated with the depository control circuitry. Such status condition information may be sent individually or in combination with other status information to the central system circuitry when the depository is polled or otherwise requested to submit status data. Of course these approaches are exemplary and in other embodiments other approaches may be used.

In some exemplary arrangements the central system circuitry may be operative to include data corresponding to acceptable operating parameters and ranges for the operation of components included in depositories. Such stored data may correspond to a model, template or other arrangement of information that provides suitable ranges for detected readings, parameters or conditions when a depository is operating properly. In exemplary arrangements communications between the central system circuitry and the control circuitry of each depository may be operative to determine the information from the depository necessary to compare the status information associated with the depository to the stored data. The central circuitry may operate in accordance with its programmed instructions to identify anomalies or irregularities in the data from the depository and to determine the condition or conditions indicated by this data. Further in exemplary arrangements the central circuitry may be operative to identify the remedial actions that are necessary in response to the data that is received from a depository.

In exemplary arrangements in response to determining abnormal conditions, problems, malfunctions or developing conditions at a depository, the central system circuitry may operate in accordance with its programmed circuit instructions to take programmed actions in response to such determinations. Such programmed actions may include for example, sending one or more messages to other systems to indicate the need for repair, servicing or other actions associated with the particular depository. In other circumstances such actions may include notifying appropriate authorities of the condition at a depository. For example if the detected condition includes an attempted theft, breach of the depository or fire condition, the central system circuitry may operate to notify appropriate police or fire authorities in the area where the depository is located. In other circumstances the central system circuitry may operate in accordance with its programming to communicate with other systems to schedule a service call or other remedial or preventive maintenance at the particular depository to correct conditions and/or to replace parts that may be reaching the predicted end of useful life. Of course these approaches are exemplary and other embodiments other approaches may be used.

In still other exemplary arrangements the central system circuitry may be operative to communicate with the depository to attempt remote correction of problematic conditions which are detected. For example, in circumstances where the depository or device included therein may not be operating in a proper manner, the exemplary system may operate to download to the control circuitry of the depository, circuit executable instructions that may correct or reduce the effect of the problem. This may include for example, downloading to the control circuitry of the depository a substitute script to be executed by the control circuitry for purposes of controlling a particular device. The central system may cause the download of instructions that cause the control circuitry of the depository to execute the substitute script and report the results to the central system. The results reported may indicate further steps that can be taken by the central system through detecting signals from the control circuitry and downloading further scripts or other instructions for purposes of remotely determining the problem and/or making corrections. In other arrangements the central system may operate to cause the control circuitry of a depository or devices connected thereto to reboot or otherwise initialize in an attempt to address problems or correct anomalies. Of course it should be understood that these approaches are exemplary and other embodiments numerous other approaches may be used.

Thus the exemplary embodiments described herein achieve improved operation, eliminate difficulties encountered in the use of prior devices and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the inventive features are not limited to the features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

The term "non-transitory" with regard to a computer readable medium is intended to exclude only the subject matter of a transitory signal, per se, where the medium itself is transitory. The term "non-transitory" is not intended to exclude any other form of computer readable media, including but not limited to media comprising data that is only temporarily stored or stored in a transitory fashion. Should the law change to allow computer readable medium itself to be transitory signals, then this exclusion is no longer valid or binding.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

I claim:

1. Apparatus comprising:
   a depository that operates to accept and make available deposit items to authorized users responsive at least in part to data read from data bearing records, including
     a body, wherein the body bounds an interior area configured for storage of deposit items,
       wherein the body includes an opening to the interior area,
     a door,
       wherein the door is movably mounted in operative connection with the body,
       wherein the door is movable between a closed position wherein the door closes the opening, and an open position wherein the interior area is accessible from outside the body, a lock, wherein the lock is in operative connection with the door, wherein the lock is selectively changeable between a locked condition, wherein in the locked condition the lock is operative to hold the door in the closed position, and an unlocked condition, wherein in the unlocked condition the door is movable from the closed position to the open position, at least one externally accessible input device, wherein the at least one input device is operatively accessible with the door in the closed position, at least one reading device, wherein the at least one reading device is configured to read indicia on items positionable in the interior area, at least one wireless communication device, control circuitry, wherein the control circuitry is in operative connection with the lock, the at least one input device, the at least one reading device, the at least one wireless communication device, wherein the control circuitry is operative to cause receipt of user identifying information through the at least one input device, an access determination to be made that the received user identifying information corresponds to stored data associated with an authorized user that is authorized to access the interior area, responsive at least in part to the access determination, the lock to change from the locked condition to the unlocked condition, whereby the door is movable to the open position, with the door in the open position, the at least one reading device to read item indicia on an item that is one of placed in or removed from the interior area, an item determination to be made concerning whether the read item indicia corresponds to stored data for a deposit item previously authorized to be at least one of placed into or removed from the interior area of the depository by the authorized user, change the lock to the locked condition such that the door is held in the closed position when the door is next closed after the deposit item has been placed into or removed from the interior area.

2. The apparatus according to claim 1 and further including at least one indicator in operative connection with the control circuitry, wherein the control circuitry is further operative to cause the at least one indicator to provide an output perceivable by the user indicative that the read item indicia corresponds to stored data for the deposit item previously authorized to be at least one of placed into or removed from the interior area of the depository by the authorized user.

3. The apparatus according to claim 1 wherein the control circuitry is further operative to cause after the deposit item has been placed into or removed from the interior area, responsive at least in part to the at least one reading device, calculation of an amount of open space within the interior area, operation of the at least one wireless device to transmit data corresponding to the amount from the depository to at least one remote system.

4. The apparatus according to claim 1 wherein the depository further includes at least one weight sensor, wherein the at least one weight sensor is in operative connection with the control circuitry, wherein the control circuitry is further operative to cause responsive at least in part to the at least one reading device and the at least one weight sensor, an action status to be determined, wherein the action status is indicative that the deposit item was either placed in or removed from the interior area, the at least one wireless communication device to transmit data corresponding to the item indicia and the action status to at least one remote system.

5. The apparatus according to claim 1 wherein the control circuitry includes at least one data store, and the at least one reading device includes at least one camera, wherein the control circuitry is further operative to cause images of the authorized user and the deposit item to be stored in the at least one data store.

6. The apparatus according to claim 1 wherein the control circuitry further includes a clock, and at least one data store, wherein the control circuitry is further operative to cause data corresponding to the user identifying information, the item indicia, and at least one time when the interior area is accessed by the user, to be stored in the at least one data store.

7. The apparatus according to claim 6 wherein the at least one reading device includes at least one camera, wherein the control circuitry is operative to cause images of the user and the deposit item to be stored in the at least one data store.

8. The apparatus according to claim 1 wherein the depository includes at least one sensor, wherein the at least one sensor is usable to determine at least one of item weight or size wherein the at least one sensor is in operative connection with the control circuitry, wherein the control circuitry is operative to make a delivery determination responsive at least in part to the at least one reading device and the at least one sensor, indicative that the deposit item has been placed into the interior area of the depository, wherein the control circuitry is operative to cause a payment for transport of the deposit item to be made to the authorized user responsive at least in part to the delivery determination.

9. The apparatus according to claim 1 wherein the depository includes at least one weight sensor, wherein the at least one weight sensor is in operative connection with the control circuitry, wherein the control circuitry is operative to make a pickup determination responsive at least in part to the at least one reading device and the at least one weight sensor, indicative that the deposit item has been removed from the interior area of the depository, wherein the control circuitry is operative responsive at least in part to the pickup determination to cause the at least one wireless device to send at least one wireless message to a remote system, wherein the at least one wireless message includes data indicative that the deposit item has been taken from the depository by the authorized user.

10. The apparatus according to claim 1
wherein the control circuitry is operative to cause a payment to be made to an owner of the depository responsive at least in part to the deposit item being placed into or removed from the interior area of the depository.

11. The apparatus according to claim 1
wherein the at least one input device comprises
an RF input device, wherein the RF input device is operative to receive wireless RF signals from a portable device of the authorized user, and
a manual input device, wherein the manual input device is manually actuatable by the authorized user.

12. The apparatus according to claim 11
wherein the at least one input device comprises
an RF input device, wherein the RF input device is operative to receive wireless RF signals from a portable device associated with the authorized user,
wherein the wireless RF signals include user identifying data corresponding to the authorized user,
wherein the manual input device includes a keypad, wherein the keypad is operative to receive a manually input code,
wherein the control circuitry is operative to cause the lock to change to the unlocked condition only on a one-time basis responsive to input of the code through the keypad.

13. The apparatus according to claim 1
and further including
a battery, wherein the battery is in operative connection with the control circuitry,
at least one solar panel, wherein the at least one solar panel is in operative connection with the battery.

14. The apparatus according to claim 1
wherein the control circuitry includes at least one data store,
wherein the control circuitry is operative responsive at least in part to the at least one reading device to include in the at least one data store, data corresponding to the item indicia on each deposit item currently positioned in the interior area,
wherein the control circuitry is operative responsive at least in part to receipt of at least one message from a remote system through the at least one wireless communication device, to cause at least one wireless response message to be sent to the remote system including data corresponding to the item indicia on each deposit item currently positioned in the interior area.

15. The apparatus according to claim 1
wherein the control circuitry is operative responsive at least in part to the at least one reading device, to make an item status determination indicative of whether the read item indicia corresponds to a deposit item that has been placed into or removed from the interior area,
wherein the control circuitry includes a clock and at least one data store,
wherein the control circuitry is operative to cause to be stored in the at least one data store for each deposit item placed into or removed from the interior area, activity data that corresponds to
the item indicia associated with each deposit item placed into or removed from the interior area,
the item status determination indicative of whether the respective item was placed into or removed from the interior area,
the user identifying information associated with a user who placed the respective deposit item into or removed the deposit item from the interior area,
a time associated with the respective placement of the deposit item into the interior area or removal of the deposit item from the interior area.

16. The apparatus according to claim 1
wherein the control circuitry is operative responsive at least in part to the at least one reading device, to make an item status determination indicative of whether the read item indicia corresponds to a deposit item that has been placed into or removed from the interior area,
wherein the control circuitry includes a clock and at least one data store,
wherein the control circuitry is operative to cause to be stored in the at least one data store for each deposit item placed into or removed from the interior area, activity data that corresponds to
the item indicia associated with each deposit item placed into or removed from the interior area,
the item status determination indicative of whether the respective item was placed into or removed from the interior area,
the user identifying information associated with a user who placed the respective deposit item into or removed the deposit item from the interior area,
a time associated with the respective placement of the deposit item into the interior area or removal of the deposit item from the interior area,
wherein the control circuitry is further operative responsive at least in part to at least one wireless message received from a remote system through the at least one wireless communication device, to cause at least one responsive wireless message including data corresponding to the activity data to be sent to the remote system.

17. The apparatus according to claim 1
wherein the at least one reading device includes at least one camera,
wherein the control circuitry is operative responsive at least in part to the at least one reading device, to make an item status determination indicative of whether the read item indicia corresponds to a deposit item that has been placed into or removed from the interior area,
wherein the control circuitry includes a clock and at least one data store,
wherein the control circuitry is operative to cause to be stored in the at least one data store for each deposit item placed into or removed from the interior area, activity data that corresponds to
the item indicia associated with each deposit item placed into or removed from the interior area,
the item status determination indicative of whether the respective item was placed into or removed from the interior area,
the user identifying information associated with a user who placed the respective deposit item into or removed the deposit item from the interior area, a time associated with the respective placement of the deposit item into the interior area or removal of the deposit item from the interior area, at least one image captured by the at least one camera, wherein the at least one image includes images recording placement of the respective deposit item into or removal of the respective deposit item from the interior area.

18. The apparatus according to claim 17
wherein the control circuitry is further operative responsive at least in part to at least one wireless message received from a remote system through the at least one wireless communication device, to cause at least one responsive wireless message including data corresponding to the activity data to be sent to the remote system.

19. The apparatus according to claim 1
wherein the control circuitry is operative to determine responsive at least in part to the at least one reading device that the deposit item was received into the interior area,
and wherein the control circuitry is further operative to cause
at least one wireless message to be sent to a portable wireless device associated with the authorized user,
wherein the at least one wireless message is operative to cause the portable wireless device to provide an output to the user that includes a request to provide at least one input to the portable wireless device to confirm that the user has placed the deposit item into the interior area of the depository.

20. The apparatus according to claim 1
wherein the control circuitry is operative responsive at least in part to the at least one reading device to determine that the deposit item was removed from the interior area of the depository,
and wherein the control circuitry is further operative to cause
at least one wireless message to be sent to a portable wireless device associated with the authorized user,
wherein the at least one wireless message is operative to cause the portable wireless device to provide an output to the user that includes a request to provide at least one input to the portable wireless device to confirm that the user has taken the deposit item from the interior area of the depository.

21. The apparatus according to claim 1
wherein the control circuitry is operative responsive at least in part to the at least one reading device to make an action status determination that the deposit item is positioned in the interior area,
wherein the control circuitry is operative responsive at least in part to the action status determination to cause at least one wireless message to be sent to a portable wireless device of a further authorized user,
wherein the at least one wireless message is operative to indicate that the further authorized user is authorized to remove the deposit item from the interior area of the depository.

22. The apparatus according to claim 1
wherein the control circuitry is operative responsive at least in part to the at least one reading device to make an action status determination that the deposit item is positioned in the interior area,
wherein the control circuitry is operative responsive at least in part to the action status determination to cause at least one wireless message to be sent to a portable wireless device of a further authorized user,
wherein the at least one wireless message includes data corresponding to further user identifying information to be input by the further authorized user to the at least one input device that will cause the lock to change to the unlocked condition.

23. The apparatus according to claim 1
wherein the control circuitry is operative responsive at least in part to the at least one reading device to make an action status determination that the deposit item is positioned in the interior area,
wherein the control circuitry is operative responsive at least in part to the action status determination to cause at least one wireless message to be sent to a portable wireless device of a further authorized user,
wherein the at least one wireless message includes data corresponding to the indicia on the deposit item to be removed from the interior area of the depository by the further authorized user.

24. The apparatus according to claim 1
wherein the control circuitry is operative responsive at least in part to the at least one reading device to make an action status determination that the deposit item is positioned in the interior area,
wherein the control circuitry is operative responsive at least in part to the action status determination to cause at least one wireless message to be sent to a portable wireless device of a further authorized user,
wherein the at least one wireless message is operative to indicate that the further authorized user is authorized to remove the deposit item from the interior area of the depository,
wherein the control circuitry is further operative to cause
receipt of further user identifying information through the at least one input device,
a further access determination to be made that the received further user identifying information corresponds to stored data associated with the further authorized user that is authorized to access the interior area,
responsive at least in part to the further access determination, the lock to change from the locked condition to the unlocked condition, whereby the door can be moved to the open position,
wherein with the door in the open position, the at least one reading device to read item indicia on the deposit item removed by the further authorized user from the interior area of the depository,
a further item determination to be made that the read item indicia corresponds to stored data for the deposit item to be removed from the interior area of the depository by the further authorized user.

25. Apparatus comprising:
a depository that operates to accept and make available deposit items to authorized users, including
a body, wherein the body bounds an interior area configured for storage of deposit items,
wherein the body includes an opening to the interior area,
a door,
wherein the door is movably mounted in operative connection with the body,
wherein the door is movable between
a closed position wherein the door closes the opening, and an open position wherein the interior area is accessible from outside the body,
a lock, wherein the lock is in operative connection with the door,
wherein the lock is selectively changeable between
a locked condition, wherein in the locked condition the lock is operative to hold the door in the closed position, and
an unlocked condition, wherein in the unlocked condition the door is movable from the closed position to the open position,
at least one externally accessible input device, wherein the at least one input device is operatively accessible with the door in the closed position,
at least one reading device, wherein the at least one reading device is configured to read indicia on items positionable in the interior area,
control circuitry, wherein the control circuitry is in operative connection with
the lock,
the at least one input device,
the at least one reading device,
wherein the control circuitry is operative to cause
receipt of user identifying information through the at least one input device,
an access determination to be made that the received user identifying information corresponds to stored data associated with an authorized user that is authorized to access the interior area,
responsive at least in part to the access determination, the lock to change from the locked condition to the unlocked condition, whereby the door is movable to the open position,
the at least one reading device to read item indicia on an item that is one of placed in or removed from the interior area,
an item determination to be made concerning whether the read item indicia corresponds to stored data for a deposit item that was authorized prior to the receipt of the user identifying information to be at least one of placed into or removed from the interior area of the depository,
change the lock to the locked condition such that the door is held in the closed position when the door is closed after the deposit item has been placed into or removed from the interior area.

26. The apparatus according to claim 25
wherein the depository includes at least one sensor, wherein the at least one sensor is usable to detect the deposit item, and
wherein the at least one sensor is in operative connection with the control circuitry,
wherein the control circuitry is operative to make a delivery determination responsive at least in part to the at least one reading device and the at least one sensor, indicative that the deposit item has been placed in the interior area of the depository,
wherein the control circuitry is operative to cause a payment for transport of the deposit item to be made to the authorized user responsive at least in part to the delivery determination.

27. Apparatus comprising:
a depository that operates to both accept and make available deposit items to authorized users, including
a body, wherein the body bounds an interior area configured for storage of deposit items,
wherein the body includes an opening to the interior area,
a door,
wherein the door is movably mounted in operative connection with the body,
wherein the door is movable between
a closed position wherein the door closes the opening, and
an open position wherein the interior area is accessible from outside the body,
a lock, wherein the lock is in operative connection with the door,
wherein the lock is selectively changeable between
a locked condition, wherein in the locked condition the lock is operative to hold the door in the closed position, and
an unlocked condition, wherein in the unlocked condition the door is movable from the closed position to the open position,
wherein in the depository is in operative connection with
at least one externally accessible input device, wherein the at least one input device is operatively accessible with the door in the closed position,
at least one reading device, wherein the at least one reading device is configured to read indicia on items positionable in the interior area,
control circuitry, wherein the control circuitry is in operative connection with
the lock,
the at least one input device,
the at least one reading device,
wherein the control circuitry is operative to cause
receipt of user identifying information through the at least one input device,
an access determination to be made that the received identifying information corresponds to an authorized user that is authorized to access the interior area,
responsive at least in part to the access determination, the lock to change from the locked condition to the unlocked condition, whereby the door is movable to the open position,
wherein the at least one reading device is operative to read item indicia on an item, wherein the item is configured to be placed in or removed from the interior area,
wherein the control circuitry is operative responsive to at least in part to the read item indicia to cause
an item determination to be made, wherein the item determination includes whether the read item indicia corresponds to stored data for a deposit item that is authorized to be placed into or removed from the interior area, wherein the stored data is determined prior to the receipt of the user identifying information,
wherein the control circuitry is operative to cause the lock to be in the locked condition such that the door is held in the closed position when the door is closed after the deposit item has been placed into or removed from the interior area.

28. Apparatus comprising:
a depository that operates to accept and make available deposit items to authorized users, including
a body, wherein the body bounds an interior area configured for storage of deposit items,
wherein the body includes an opening to the interior area, a door,
  wherein the door is movably mounted and operative connection with the body,
  wherein the door is movable between
    a closed position wherein the door closes the opening, and
    an open position wherein the interior area is accessible from outside the body,
a lock, wherein the lock is in operative connection with the door,
  wherein the lock is selectively changeable between
    a locked condition, wherein in the locked condition the lock is operative to hold the door in the closed position, and
    an unlocked condition, wherein in the unlocked condition the door is movable from the closed position to the open position,
wherein the depository is in operative connection with
  at least one externally accessible input device, wherein the at least one input device is operatively accessible with the door in the closed position,
  at least one reading device, wherein the at least one reading device is configured to read indicia on items positionable in the interior area, and
  control circuitry, wherein the control circuitry is in operative connection with
    the lock,
    the at least one input device,
    the at least one reading device,
  wherein the control circuitry is operative to cause
    receipt of identifying information through the at least one input device,
    an access determination to be made that the received identifying information corresponds to an authorized user that is authorized to access the interior area,
    responsive at least in part to the access determination, the lock to change from the locked condition to the unlocked condition, whereby the door is movable to the open position,
  wherein the at least one reading device is operative to read item indicia on an item, wherein the item is configured to be placed in or removed from the interior area,
  wherein the control circuitry is operative responsive at least in part to the read item indicia to cause
    an item determination to be made concerning whether the read item indicia corresponds to stored data for a deposit item that is authorized prior to receipt of the identifying information, to be at least one of placed into or removed from the interior area of the depository,
  wherein the control circuitry is operative to cause the lock to be in the locked condition such that the door is held in the closed position when the door is closed after the deposit item has been placed into or removed from the interior area.

* * * * *